United States Patent
Sidiropoulos et al.

(10) Patent No.: US 10,374,676 B2
(45) Date of Patent: *Aug. 6, 2019

(54) CHANNEL TRACKING AND TRANSMIT BEAMFORMING WITH FRUGAL FEEDBACK

(71) Applicant: Regents of the University of Minnesota, Minneapolis, MN (US)

(72) Inventors: Nikolaos D. Sidiropoulos, Edina, MN (US); Omar A. Mehanna, San Jose, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/492,916

(22) Filed: Apr. 20, 2017

(65) Prior Publication Data

US 2017/0289835 A1 Oct. 5, 2017

Related U.S. Application Data

(63) Continuation of application No. 14/883,044, filed on Oct. 14, 2015, now Pat. No. 9,647,745.
(Continued)

(51) Int. Cl.
*H04B 7/08* (2006.01)
*H04B 7/06* (2006.01)
(Continued)

(52) U.S. Cl.
CPC ......... *H04B 7/0626* (2013.01); *H04B 7/0417* (2013.01); *H04B 7/0421* (2013.01);
(Continued)

(58) Field of Classification Search
USPC ................ 375/211, 219, 220, 221, 222, 240, 375/240.24, 240.26, 240.27, 254, 259,
(Continued)

(56) References Cited

U.S. PATENT DOCUMENTS 7,099,634 B2 * 8/2006 Tanaka ................ H04B 7/0634
375/299
7,376,192 B2 5/2008 Koorapaty et al.
(Continued)

FOREIGN PATENT DOCUMENTS

EP 2448137 A1 5/2012

OTHER PUBLICATIONS

Ribero et al, SOI-KF: Distributed Kalman Filtering with Low Cost Communicatoisn Using the Sign of Innovations, IEEE Transactions on Signal Processing, vol. 54, No. 12, Dec. 2006, pp. 4782-4795.*
(Continued)

*Primary Examiner* — Linda Wong
(74) *Attorney, Agent, or Firm* — Shumaker & Sieffert, P.A.

(57) ABSTRACT

In general, this disclosure describes techniques for beamforming using limited feedback that exploit the spatio-temporal channel correlation and avoid the limitations of codebook-based feedback and Markov chain modeling. In one example, a receiving device includes a plurality of receive antennas for receiving communication information, a memory for storing the communication information, and one or more processors for processing the communication information. The one or more processors are configured to receive, through a wireless communication channel, a pilot signal transmitted by a transmitting device, determine, based on the received pilot signal, channel state feedback comprising a quantized representation of the pilot signal as received at the receiving device, and send, through the wireless communication.

20 Claims, 20 Drawing Sheets

Related U.S. Application Data

(60) Provisional application No. 62/063,717, filed on Oct. 14, 2014.

(51) Int. Cl.
*H04B 17/24* (2015.01)
*H04B 7/0417* (2017.01)

(52) U.S. Cl.
CPC ......... *H04B 7/0619* (2013.01); *H04B 7/0621* (2013.01); *H04B 7/0636* (2013.01); *H04B 7/0639* (2013.01); *H04B 7/0695* (2013.01); *H04B 7/08* (2013.01); *H04B 17/24* (2015.01)

(58) Field of Classification Search
USPC ....... 375/284, 285, 278, 295, 296, 316, 324, 375/340, 346, 348, 354, 358, 356, 375/229–236
See application file for complete search history.

(56) References Cited

U.S. PATENT DOCUMENTS

| | | | |
|---|---|---|---|
| 8,325,844 B2 | 12/2012 | Walton et al. | |
| 8,675,780 B2 | 3/2014 | Chockalingam et al. | |
| 2004/0248608 A1* | 12/2004 | Kobayashi | H04W 52/12 455/522 |
| 2004/0259514 A1 | 12/2004 | Nissila | |
| 2006/0018389 A1* | 1/2006 | Koorapaty | H04B 7/0626 375/259 |
| 2006/0262754 A1* | 11/2006 | Andersson | H04B 17/336 370/332 |
| 2008/0181288 A1* | 7/2008 | Wurzbach | H04L 25/0224 375/224 |
| 2008/0310542 A1* | 12/2008 | Gao | H04L 1/0028 375/267 |
| 2009/0060082 A1* | 3/2009 | Yuda | H04B 7/0421 375/267 |
| 2010/0227561 A1* | 9/2010 | Chakraborty | H04L 5/0007 455/63.1 |
| 2011/0058506 A1* | 3/2011 | Lee | H04B 7/0619 370/280 |
| 2011/0165846 A1* | 7/2011 | Zheng | H04B 7/0417 455/67.13 |
| 2011/0241917 A1 | 10/2011 | Baraniuk et al. | |
| 2012/0082198 A1* | 4/2012 | Zhang | H04B 7/0617 375/224 |
| 2012/0114080 A1* | 5/2012 | Karthik | H04L 25/022 375/340 |
| 2012/0281641 A1* | 11/2012 | Cui | H04W 52/346 370/329 |
| 2013/0100911 A1 | 4/2013 | Lv et al. | |
| 2013/0101060 A1* | 4/2013 | Cendrillon | H04B 7/0851 375/267 |
| 2013/0259147 A1 | 10/2013 | Wang et al. | |
| 2013/0272263 A1 | 10/2013 | Pi et al. | |
| 2013/0272698 A1* | 10/2013 | Jin | H04L 27/2628 398/43 |
| 2013/0279615 A1* | 10/2013 | Thomas | H04B 7/0617 375/260 |
| 2014/0044069 A1* | 2/2014 | Bao | H04B 7/0417 370/329 |
| 2014/0066116 A1* | 3/2014 | Gao | H04W 24/10 455/509 |
| 2014/0134953 A9* | 5/2014 | Rangan | H04W 24/10 455/63.1 |
| 2014/0348106 A1* | 11/2014 | Bao | H04B 7/0626 370/329 |
| 2014/0348273 A1* | 11/2014 | Thomas | H04L 1/0036 375/344 |
| 2014/0355713 A1* | 12/2014 | Bao | H04B 7/0456 375/295 |
| 2015/0139121 A1* | 5/2015 | Shirani-Mehr | H04B 7/0469 370/329 |
| 2015/0281993 A1 | 10/2015 | Chen et al. | |

OTHER PUBLICATIONS

Ribero et al, SOI-KF: Distributed Kalman Filtering with Low Cost Communicatoisn Using the Sign of Innovations, IEEE Transactions on Signal Processing, vol. 54, No. 12, Dec. 2006, pp. 4782-4795 (Year: 2006).*

"3GPP TS 36.213 V9.2.0 LTE; Evolved Universal Terrestrial Radio Access (E-UTRA); Physical layer procedures," Jun. 2010, 82 pp.

Baddour et al., "Autoregressive Modeling for Fading Channel Simulation," IEEE Transactions on Wireless Communications, vol. 4, No. 4, Jul. 2005, pp. 1650-1662.

Bosisio et al., "Kalman Filter of Channel Modes in Time-Varying Wireless Systems," vol. 3, ICASSP 2005, Mar. 18-23, 2005, 4 pp.

Boyd et al., "Section 9.5, Convex Optimization," Cambridge University Press, 2004, 16 pp. (Applicant points out, in accordance with MPEP 609.04(a), that the year of publication, 2004, is sufficiently earlier than the effective U.S. filed, Apr. 2017, so that the particular month of publication is not in issue.).

Huang et al., "Limited Feedback Beamforming Over Temporally-Correlated Channels," IEEE Transactions on Signal Processing, vol. 57, No. 5, May 2009, pp. 1959-1975.

Jiang et al., "Linearly Reconfigurable Kalman Filtering for a Vector Process," 2013 IEEE International Conference on Acoustics, Speech and Signal Processing, ICAASP 2013, May 26-31, 2013, pp. 5725-5729.

Kay, "Fundamentals of Statistical Signal Processing: Estimation Theory," Prentice Hall, 1993, 303 pp. (Applicant points out, in accordance with MPEP 609.04(a), that the year of publication, 1993, is sufficiently earlier than the effective U.S. filing date, Apr. 2017, so that the particular month of publication is not in issue.)

Larsson et al., "Massive MIMO for Next Generation Wireless Systems," IEEE Communications Magazine, vol. 52, vol. 2, Feb. 2014, pp. 186-195.

Lau et al., "On the Design of MIMO Block-Fading Channels With Feedback-Link Capacity Constraint," IEEE Transactions on Communications, vol. 52, No. 1, Jan. 2004, pp. 62-70.

Liu et al., "Space-Time Coding and Kalman Filtering for Time-Selective Fading Channels," IEEE Transactions on Communications, vol. 50, No. 2, Feb. 2002, pp. 183-186.

Love et al., "An Overview of Limited Feedback in Wireless Communication Systems," IEEE Journal on Selected Areas in Communications, vol. 26, No. 8, Oct. 2008, pp. 1341-1365.

Love et al., "Grassmannian Beamforming for Multiple-Input Multiple-Output Wireless Systems," IEEE Transactions on Information Theory, vol. 49, No. 10, Oct. 2003, pp. 2735-2747.

Mehanna et al., "Channel Tracking and Transmit Beamforming With Frugal Feedback," IEEE Transactions on Signal Processing, vol. 62, No. 24, Dec. 15, 2014, pp. 6402-6413.

Mehanna et al., "Frugal Channel Tracking for Transmit Beamforming," 2014 48th Asilomar Conference on Signals, Systems and Computers, Nov. 2-5, 2014, pp. 993-997.

Msechu et al., "Decentralized Quantized Kalman Filtering With Scalable Communication Cost," IEEE Transactions on Signal Processing, vol. 56, No. 8, Aug. 2008, pp. 3727-3741.

Mukkavilli et al., "On Beamforming With Finite Rate Feedback in Multiple-Antenna Systems," IEEE Transactions on Information Theory, vol. 49, No. 10, Oct. 2003, pp. 2562-2579.

Ribeiro et al, SOI-KF: Distributed Kalman Filtering With Low Cost Communications Using the Sign of Innovations, IEEE Transactions on Signal Processing, vol. 54, No. 12, Dec. 2006, pp. 4782-4795.

Sadek et al., "Exploiting Spatio-Temporal Correlation for Rate-Efficient Transmit Beamforming," Conference Record of the 38th Asilomar Conference on Signals, Systems and Computers, Nov. 7-10, 2004, pp. 2027-2031.

Simon et al., "Feedback Reduction for Spatial Multiplexing with Linear Precoding," ICASSP 200, Apr. 15-20, 2007, 6 pp.

(56) References Cited

OTHER PUBLICATIONS

Xia et al., "Design and Analysis of Transmit-Beamforming based on Limited-Rate Feedback," IEEE Transactions on Signal Processing, vol. 54, No. 5, May 2006, pp. 1853-1863.
Jakes, "Microwave Mobile Communications," IEEE, Wiley & Sons, 1974, 645 pp. (Applicant points out, in accordance with MPEP 609.04(a), that the year of publication, 1974, is sufficiently earlier than the effective U.S. filing date, Apr. 2017, so that the particular month of publication is not in issue.).
Prosecution History from U.S. Appl. No. 14/883,044, dated Apr. 14, 2016, through Jan. 20, 2017, 63 pp.

* cited by examiner

CHANNEL TRACKING AND TRANSMIT BEAMFORMING WITH FRUGAL FEEDBACK

PRIORITY CLAIM

This application is a continuation of U.S. patent application Ser. No. 14/883,044, filed on Oct. 14, 2015 and entitled "CHANNEL TRACKING AND TRANSMIT BEAMFORMING WITH FRUGAL FEEDBACK," which claims the benefit of Provisional U.S. Patent Application No. 62/063,717, filed Oct. 14, 2014 and entitled "CHANNEL TRACKING AND TRANSMIT BEAMFORMING WITH FRUGAL FEEDBACK." The entire contents of U.S. application Ser. Nos. 14/883,044 and 62/063,717 are incorporated herein by reference.

GOVERNMENT CLAUSE

This invention was made with government support under ECCS-1231504 and AST-1247885 awarded by the National Science Foundation. The government has certain rights in the invention.

BACKGROUND

Transmit beamforming can enhance the performance of multiple-input multiple-output (MIMO) systems by exploiting channel state information (CSI) at the transmitter. In the frequency-division duplex (FDD) mode, where the downlink and uplink channels are not reciprocal, the receiver must feedback information about the downlink channel to the transmitter. In systems with many transmit antennas, the feedback overhead can be overwhelming; and the challenge is to limit the feedback to only a few bits that still provide sufficient information about the channel.

Current technology may utilize transmit beamforming with limited feedback to address this challenge by designing efficient beamformer weight vector quantization algorithms at the receiver. In some implementations, the focus is on designing a common beamformer codebook the is known both at the transmitter and receiver. At runtime, the receiver estimates the downlink channel, finds the best-matching beamforming vector in the codebook, and feeds back a corresponding index into the codebook to the transmitter. Codebook design can be based on maximizing the average signal-to-noise ratio (SNR), maximizing the average mutual information, or minimizing the outage probability, and it can be viewed as a vector quantization problem, where the generalized Lloyd algorithm (GLA) can be used to construct the codebook. This codebook-based framework assumes accurate CSI at the receiver, which in turn implies significant downlink pilot overhead. For large codebooks, which are necessary when the number of transmit-antennas is large, the feedback overhead can be significant, and the computational complexity of searching the codebook for the best beamformer can be prohibitive.

Another issue is that assumption of a Rayleigh block-fading model, according to which the channel remains constant over a block of symbols and changes independently across different blocks. The block-fading assumption overlooks the channel temporal correlation, which can be exploited to decrease the feedback rate. The temporal correlation of the channel can be exploited by modeling the quantized CSI at the receiver as a finite-state Markov chain, and computing the transition probability of every codebook entry given the previous (one or more) codebook entries. As one example, variable-length Huffman source coding is applied to the transition probabilities of the Markov chain to compress the CSI feedback. This approach is not suitable for practical communication systems with limited feedback, which provision a fixed number of feedback bits per CSI slot, as in e.g., LTE. As another example, a different fixed-length but lossy CSI compression algorithm can be used, where low-probability transitions between the Markov chain states are truncated. For large-size codebooks, computing the transition probabilities accurately for a large number of Markov states is an elusive task that requires very long training periods. Moreover, the transition probabilities are dependent on the specific channel model new computations are necessary whenever the model varies significantly.

SUMMARY

Techniques of the present disclosure provide an approach for beamforming using limited feedback that exploits the spatio-temporal channel correlation and avoids the limitations of codebook-based feedback and Markov chain modeling. In example implementations, the transmitter periodically transmits a beamformed pilot signal in the downlink, while the receiver quantizes the corresponding received signal (e.g., 2-bit coarse quantization), and sends the quantization bits to the transmitter through the uplink feedback channel. Therefore, instead of estimating the channel at the receiver and sending the quantized CSI to the transmitter as in codebook-based beamforming, the receiver feeds back a quantized (noisy) linear measurement of the channel. In this way, the transmitter can accurately estimate and track the channel using such few (periodic) feedback bits.

Example implementations of the techniques of the present disclosure employ a 2-bit quantization scheme that is based on the sign of innovation (SOI), and extend a SOI-Kalman filtering (KF) framework to enable transmit beamforming with limited feedback if the channel follows an autoregressive (AR) model. For general (non-AR or even unknown) channel models, the present disclosure provides a novel channel tracking approach that exploits the quantization bits in a maximum a posteriori (MAP) estimation formulation. By exploiting the high temporal and/or spatial correlation of the channel, and with very limited feedback rate (i.e., 2-bits per block), the performance of a system employing the techniques described herein is close to that attainable with perfect CSI at the transmitter. Thus, when using transmit beamforming for massive MIMO in FDD mode, the techniques described herein can avoid the very large-size codebooks that would be required for codebook-based beamforming as well as the huge feedback overhead associated with accurate CSI feedback. Systems configured in accordance with the techniques described herein may benefit from a lower pilot overhead in the downlink (e.g., pilot reduction can be exploited to increase downlink data rate or increase downlink capacity) and/or a lower feedback rate in the uplink (e.g., reduced feedback can be exploited to increase the uplink data rate or increase uplink capacity). Furthermore, the techniques described herein may enable lower computational complexity and/or smaller memory at a receiving device (e.g., no codebook search or storage necessary).

The details of one or more examples are set forth in the accompanying drawings and the description below. Other features, objects, and advantages will be apparent from the description and drawings, and from the claims.

DETAILED DESCRIPTION

Figure 1:
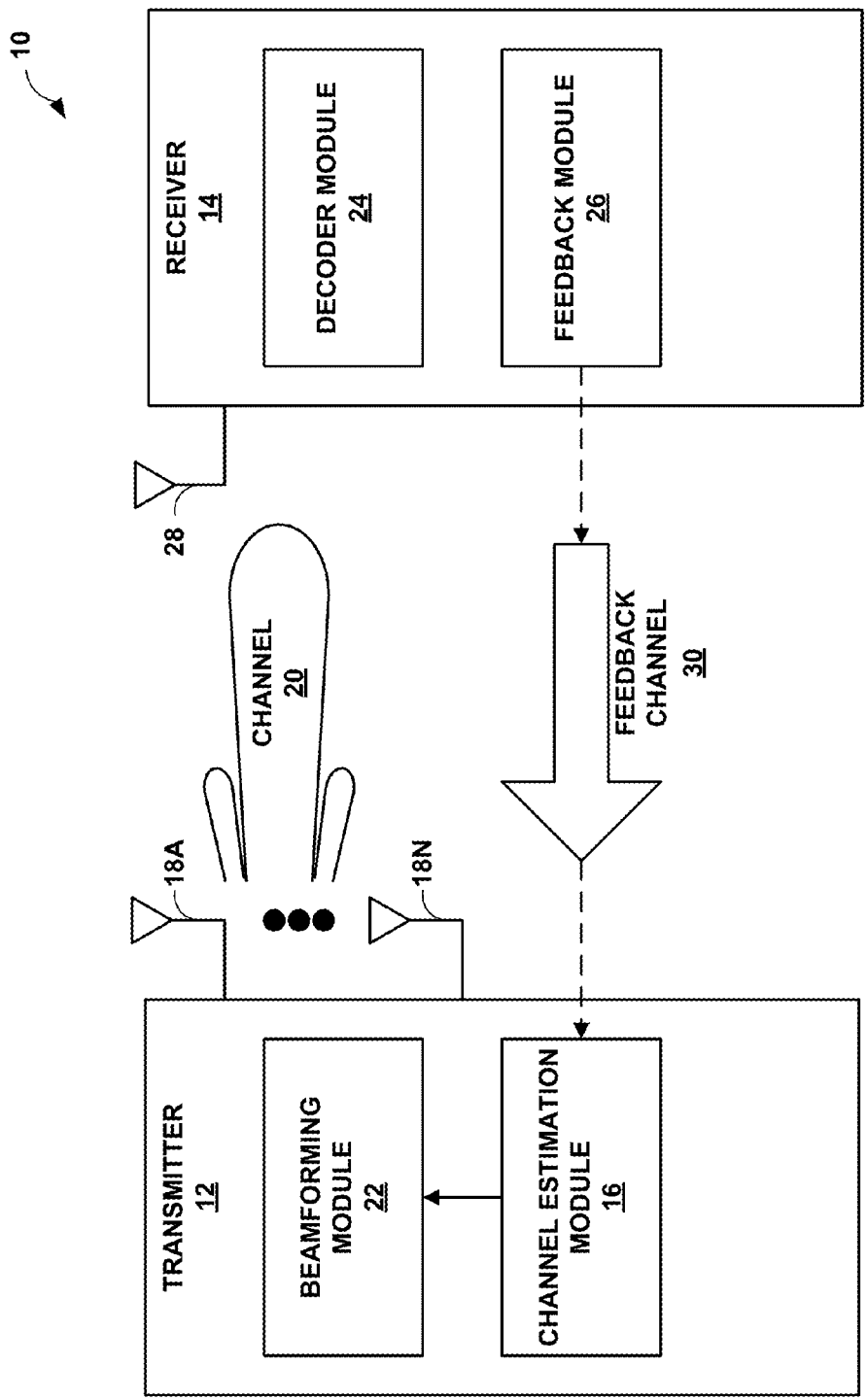
FIG. 1 is a block diagram illustrating a simplified space-time wireless communication system.

FIG. 1 is a block diagram illustrating a simplified wireless communication system 10 including a transmitting device 12 (also referred to as transmitter 12) and a receiving device 14 (also referred to as receiver 14). In this example, transmitting device 12 codes signals and transmits the signals via multiple antennas 18A-18N (collectively, "antennas 18"). In the example of FIG. 1, receiving device 14 includes antenna 28 for receiving signals from device 12. In some examples, receiving device 14 may include multiple antennas.

Transmitting device 12 and receiving device 14 may comprise any of a wide variety of wireless devices that communicate with one another. For example, one of devices 12, 14 may comprise a mobile device and the other of devices 12, 14 may comprise a base station, e.g., in a digital cellular communication system. Alternatively, one of devices 12, 14 may comprise a wireless computer and the other may comprise a wireless network access point, e.g., in a wireless networking setting. In addition, in other applications, each of devices 12, 14 may comprise direct two-way communication devices. In general, system 10 may comprise any of a wide variety of wireless communication systems which could benefit from the feedback techniques described herein.

As shown in the example of FIG. 1, transmitter 12 includes beamforming module 22 and channel estimation module 16. Receiver 14 includes decoder module 24 and feedback module 26. Each of modules 22, 16, 24, 26 may, in various examples, include hardware, firmware, software, or some combination thereof. For instance, each of modules 22, 16, 24, 26 may represent a collection of signal processing hardware operable to perform the various operations described herein. While shown in the example of FIG. 1 as including specific components, transmitter 12 and/or receiver 14 may, in various examples, include additional or different components.

In accordance with the invention, transmitter 12 sends, via antennas 18 through channel 20, a pilot signal in accordance with a current set (referred to herein as a "first set") of transmission parameters, e.g., a beamforming vector applied by beamforming module 22. The current set of transmission parameters may be based in part on a current estimated state of the channel (e.g., channel estimation information). Receiver 14 receives the pilot signal corresponding to transmitted pilot symbols for decoding by decoder module 24, and feedback module 26 computes a quantization of the received signal (referred to herein as "frugal feedback"). For instance, receiver 14 may quantize the received pilot signal as a number of binary bits and send the quantization back to transmitter 12 via feedback channel 30. Channel estimation module 16 of transmitter 12 may utilize the received frugal feedback to update the current estimate for communication channel 20, i.e., determine a second estimated state of the channel, and generate a second set of transmission parameters based on updated estimate. In this way, channel estimation module 16 of transmitter 12 may track the current state of communication channel 30, and beamforming module 22 may, in response to updated channel estimates, beamform the transmission based on the received frugal feedback. In other words, the techniques described herein provide a low-overhead feedback technique in which transmitter 12 determines channel information for a multi-path communication channel for use in subsequent transmissions and receiver 14 performs light-weight signal analysis to provide minimal feedback. In various examples, different methods of feedback generation and channel estimation may be used, as described herein.

The signals transmitted between devices 12, 14 may comprise single carrier signals, or multi-carrier signals. The techniques may be especially useful, for example, for massive multiple-input multiple-output (MIMO) systems in frequency-division duplex (FDD) mode. Any of a wide variety of modulation techniques can be used, including, for example, code division multiple access (CDMA), time division multiple access (TDMA), frequency division multiple access (FDMA), orthogonal frequency division multiplexing (OFDM), various other modulation techniques, or even two or more modulation techniques.

Throughout this description, boldface, uppercase letters are used to denote matrices, and boldface, lowercase letters are used to denote column vectors. $(\bullet)^T$ and $(\bullet)^H$ are used to denote transpose and Hermitian (conjugate) transpose operators, respectively. Trace($\bullet$), $\|\bullet\|$, $|\bullet|$, Re$\{\bullet\}$ and Im$\{\bullet\}$ are used to denote the trace, the Euclidean norm, the absolute value, the real, and the imaginary operators, respectively. Matlab notations diag(x) and Toeplitz(x) denote the diagonal matrix and the Toeplitz matrix that are formed with vector x, respectively. mod(x, y) returns the modulus after division of x by y. The operator $\odot$ is used to denote the Hadamard (elementwise) product of two matrices. $\mathbb{E}[\bullet]$ denotes the ensemble average. $\mathcal{CN}(a, C)$ denotes the complex Gaussian distribution with mean a and covariance matrix C. I denotes the identity matrix. The function sign(x)=1 if x≥0 and −1 otherwise.

$$Q(x) := \frac{1}{2\pi} \int_x^\infty e^{-u^2/2} du$$

is the standard Gaussian tail integral.

In the example of FIG. 1, system 10 may represent a downlink transmit beamforming setting as described in Section II of "Channel Tracking and Transmit Beamforming with Frugal Feedback," Mehanna, et al., attached below as an Appendix and incorporated herein by reference in its entirety (hereinafter, "Channel Tracking"). System 10 may use a time-slotted downlink frame structure, where the duration of each slot is T seconds. At the beginning of each time slot n, transmitter 12 may send (e.g., via antennas 18) a unit-power pilot symbol s(n) that is known at receiver 14

(e.g., downlink pilot rate is 1/T symbols/s), followed by data transmission for the remainder of the slot duration. In accordance with the techniques described herein, beamforming module 22 may beamform the pilot symbol s(n) with a unit-norm N×1 beamforming vector w(n) (i.e., the weights applied to the N transmit-antenna elements when transmitting s(n) are the conjugate entries of w(n)), and beamform the data symbols with a different unit-norm N×1 beamforming vector $\tilde{w}(n)$.

In the example of FIG. 1, beamforming module 22 may beamform the pilot symbol and/or the data symbols and thereby cause antennas 18 to transmit through channel 20. As in the Appendix below, an autoregressive (AR) model can be used to model the temporal progression of the frequency-flat channel between the N transmit-antennas and the receive antenna at time slot n. That is, in some examples, channel 20 may be modelled using an AR model, such as that defined by Equation (1) in the Appendix below. However, the channel need not be restricted to such a model. Rather, Equation (1) is used only for its analytical tractability. Note that unlike the common assumption on limited feedback, the techniques described herein do not require that the channel is perfectly known at the receiver.

In the example of FIG. 1, receiver 14 may receive (e.g., at antenna 28) signals from channel 20. As further described in the Appendix below, the received signal that corresponds to the transmitted pilot s(n) can be expressed as $$\bar{y}(n)=w^H(n)h(n)s(n)+\bar{v}(n)$$

where the random variable $\bar{v}(n)\sim\mathcal{CN}(0,\sigma_v^2)$ models the additive white Gaussian noise (AWGN), i.e., $\{\bar{v}(n)\}$ are independent and identically distributed (i.i.d.) with a zero-mean Gaussian marginal distribution.

One or more components of receiver 14 (e.g., feedback module 26) may multiply the received signal $\bar{y}(n)$ by $s^*(n)$. That is, receiver 14 may de-scramble the signal. De-scrambling yields:

$$y(n):=s^*(n)\bar{y}(n)=w^H(n)h(n)+v(n)$$

where the random variable $\bar{v}(n)\sim\mathcal{CN}(0,\sigma_v^2)$ and $\{v(n)\}$ are i.i.d. Feedback module 26 may pass y(n) through a quantizer, and send the output (e.g., quantization bits) back to transmitter 12 through an uplink feedback channel 30.

As explained in more detail in the Appendix below, in one example feedback module 26 of receiver 14 sends transmitter 12 a quantized representation of a pilot signal as received by receiver 14. The quantized representations of the pilot signal computed by the receiving device may, for example, comprise a quantized representation of a difference between the pilot signal received by the receiving device and a pilot signal predicted by the receiving device to be received based on a current estimate of the channel determined by the receiving device. In some example implementations, the quantized representations may indicate only a sign of the difference, e.g., a Sign of Innovation (SOI).

In the example of FIG. 1, one or more components of transmitter 12 (e.g., channel estimation module 16) may receive the quantization bits via feedback channel 30. Channel estimation module 16 may estimate and track the channel h(n) using the few received (periodic) feedback bits. Transmitter 12 (e.g., beamforming module 22) may then use the channel estimate $\hat{h}(n)$ to design the beamforming vector that is used for data transmission in time slot n as $$\tilde{w}(n)=\frac{\hat{h}(n)}{\|\hat{h}(n)\|}.$$

Assuming that the data symbols are temporally white with zero-mean and unit-variance, and that the AWGN is zero-mean and unit-variance, the average receive-SNR can be expressed as $\gamma=\mathbb{E}[|\tilde{w}^H(n)h(n)|^2]$. Further details of the time-slotted downlink frame structure and the proposed limited feedback beamforming system are shown in FIG. 1 of the Appendix below. Several design approaches for the pilot beamforming vector are discussed in Section V, and compared in Section VI of the Appendix below.

While described in the example of FIG. 1 as having a single antenna 28, receiver 14 may, in other examples, include multiple antennas. In some such examples, receiver 14 may replicate some or all of the techniques described herein at the receive end of channel 20. That is, receiver 14 may include functionality the same as or similar to that of channel estimation module 16, operable to concatenate the feedback bits from all receive antennas and send back on the reverse link.

In some examples in which receiver 14 includes multiple receive antennas, system 10 may leverage the potential correlations between the channel vectors corresponding to nearby receive antennas (especially if receive antenna spacing is under λ/2). For instance, receiver 14 may stack all the channel vectors corresponding to the different transmit antennas into one long vector, and apply the techniques described herein to this compound channel vector. When all channel vectors are stacked into one long vector, the SOI-KF-based approach may be extended in a way that parallels the vector state—vector observation case described herein, with $2N_r$ feedback bits, where $N_r$ is the number of receive antennas. Receiver 14 may implement this approach to potentially provide certain advantages or benefits in scenarios where there is spatial correlation between the multiple (e.g., two) receive channels, and such techniques may be particularly advantageous where channel coherence time is short. For example, a short channel coherence time indicates that the channels de-correlate quickly over time. In this manner, receiver 14 represents an example of a receiving device that includes a plurality of receive antennas for receiving communication information, a memory for storing the communication information, and one or more processors for processing the communication information. The one or more processors are configured to receive, through a wireless communication channel, a pilot signal transmitted by a transmitting device. The one or more processors are further configured to determine, based on the received pilot signal, channel state feedback comprising a quantized representation of the pilot signal as received at the receiving device. The one or more processors are further configured to send, through the wireless communication channel, the channel state feedback to the transmitting device.

When receiver 14 is equipped with multiple antennas, it is possible to transmit using a higher-rank covariance (multiple beams) during payload transmission. However, single-antenna or round-robin unitary beamforming may still be useful transmission modalities for the pilot phase, due to their simplicity and good performance. Note that if the receiver uses receive beamforming, and the receive beamforming weights are fixed, then the channel tracking and transmit beamforming problems reduce back to the one considered in the case of a single-antenna receiver. If both the transmit and the receive beamforming vectors can be updated, then transmitter 12 and receiver 14 can simply take turns, updating the transmitter for fixed receiver, then the receiver for fixed transmitter, in a round-robin fashion, using the techniques described herein.

Figure 2:
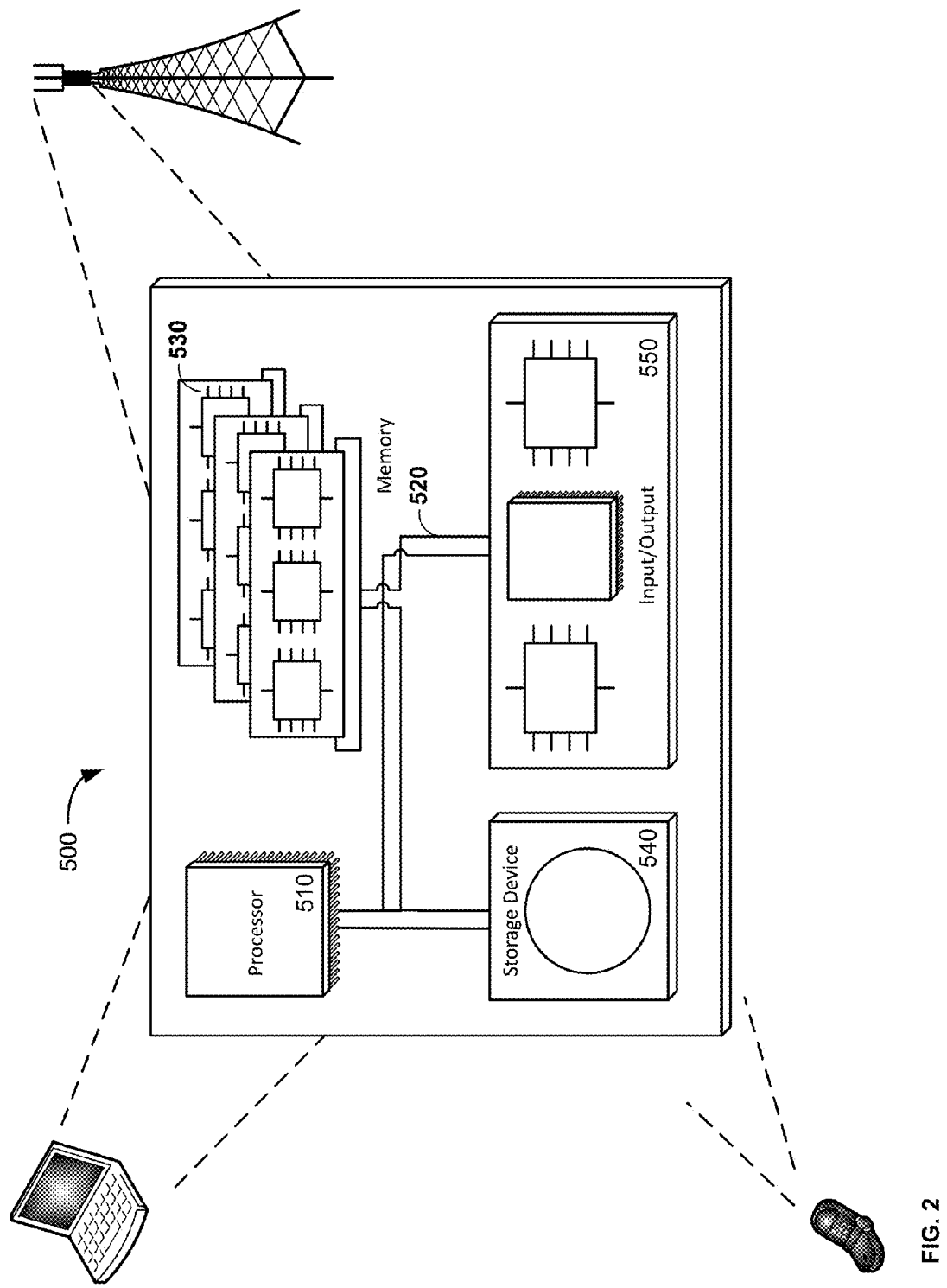
FIG. 2 is a block diagram showing a detailed example of various devices that may be configured to implement some embodiments in accordance with one or more techniques of the present disclosure.

FIG. 2 is a block diagram showing a detailed example of various devices that may be configured to implement some embodiments in accordance with one or more techniques of the present disclosure. For example, device 500 may be a laptop computer, a mobile device, such as a mobile phone or smartphone, a communications controller, such as the controller of a cellular communications tower, or any other hardware, software, firmware, or combination thereof that is capable of executing the techniques described herein. Any or all of the devices may, for example, implement portions of the techniques described herein for use by a transmitter and/or receiver in channel tracking and transmit beamforming using frugal feedback.

In the example of FIG. 2, a computer 500 includes a processor 510 that is operable to execute program instructions or software, causing the computer to perform various methods or tasks, such as performing the techniques for channel tracking and transmit beamforming and/or providing frugal feedback for a received channel as described herein. That is, computer 500, in various examples, may represent either or both of transmitter 12 and receiver 14.

In the example of FIG. 2, processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data of the content database, and other information. The computer also includes various input-output elements 550, including wireless communication interfaces such as Wi-Fi, cellular data networks, or any other elements for establishing or detecting wireless channels as described herein.

The computer itself may be a traditional computer, an application specific integrated circuit (ASIC), a collection of signal processing devices and other hardware, or any other type of computerized system. The computer, in some examples, may include fewer than all elements listed above, such as a mobile device having only some of the shown elements. In another example, the computer is distributed among multiple systems, such as a distributed antenna array that has many transmitters and/or receivers working together to provide various functions.

Figure 3:
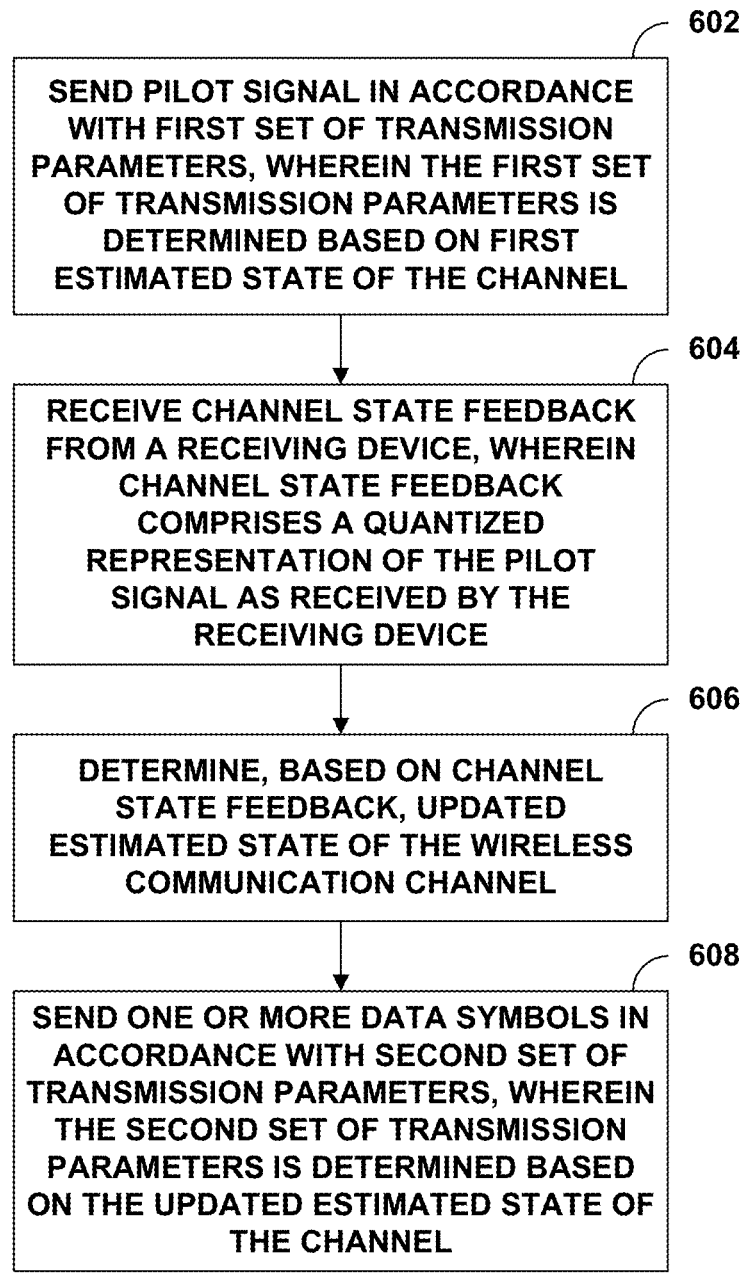
FIG. 3 is a flow diagram illustrating example operations for channel tracking and transmit beamforming using received frugal feedback in accordance with one or more techniques of the present disclosure.

FIG. 3 is a flow diagram illustrating example operations for channel tracking and transmit beamforming using received frugal feedback, in accordance with one or more techniques of the present disclosure. For purposes of illustration only, the example operations of FIG. 3 are described below within the context of FIGS. 1 and 2.

In the example of FIG. 3, computer 500 (e.g., acting as transmitter 12) may send, through a wireless communication channel, a pilot signal in accordance with a first set of transmission parameters (602). The first set of transmission parameters may be determined based on a first estimated state of the channel. Transmitter 12 may receive channel state feedback from a receiving device (604). The channel state feedback may include a quantized representation of the pilot signal as received by the receiving device. For example, the quantized representation of the pilot signal as received by the receiving device may include a quantized representation of a difference between the pilot signal received by the receiving device and a pilot signal predicted by the receiving device to be received based on a current estimate of the channel determined by the receiving device.

Based on the channel state feedback, transmitter 12 may determine an updated estimated state of the wireless communication channel (606). Transmitter 12 may send, via the wireless communication channel, one or more data symbols in accordance with a second set of transmission parameters (608). The second set of transmission parameters may be determined based on the updated estimated state of the channel.

Figure 4:
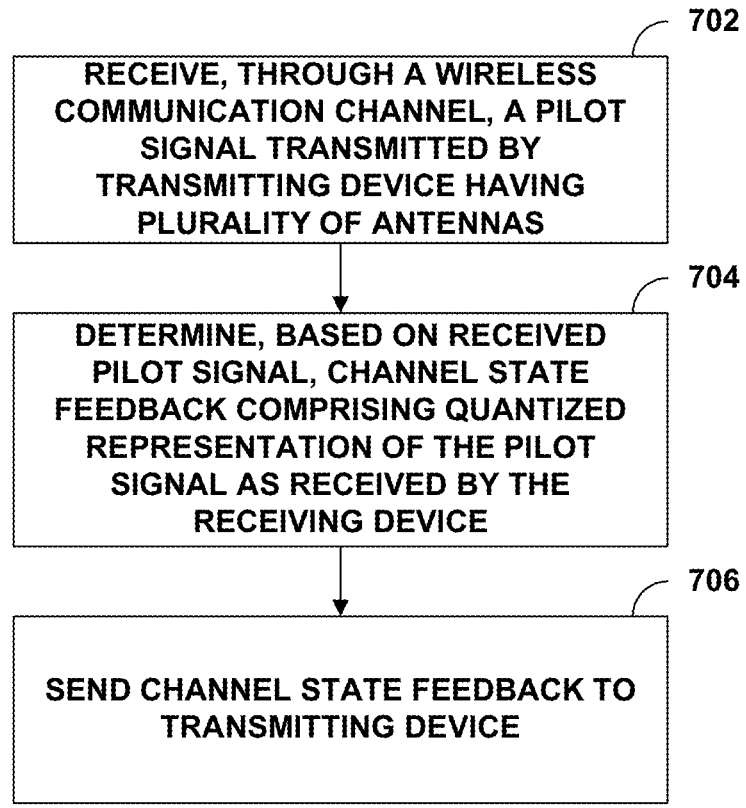
FIG. 4 is a flow diagram illustrating example operations for receiving beamformed signals and providing frugal feedback in accordance with one or more techniques of the present disclosure.

FIG. 4 is a flow diagram illustrating example operations for receiving beamformed signals and providing frugal feedback, in accordance with one or more techniques of the present disclosure. For purposes of illustration only, the example operations of FIG. 4 are described below within the context of FIGS. 1 and 2.

In the example of FIG. 4, computer 500 (e.g., acting as receiver 14) may receive, through a wireless communication channel, a pilot signal transmitted by a transmitting device having a plurality of antennas (702). Receiver 14 may determine, based on the received pilot signal, channel state feedback comprising a quantized representation of the pilot signal as received by the receiving device (704). For example, in determining the quantized representation of the pilot signal, receiving device 14 may determine a current estimate for the communication channel, determine a predicted pilot signal based on the current estimate of the channel, and compute the quantized representation as a difference between the pilot signal received by the receiving device and the predicted pilot signal. In some examples, receiving device 14 may compute the quantized representation to indicate only a sign of the difference. In some examples, to receive the pilot signal, receiving device 14 may receive a plurality of beamformed signals, such that each received beamformed signal is received at a respective receive antenna of a plurality of receive antennas coupled to the receiving device. According to these examples, receiving device 14 may determine the current estimate for the communication channel by performing sign of innovation (SOI) Kalman filtering (KF) with respect to each received beamformed signal. In some examples, the current estimate for the communication channel is based at least in part on a spatio-temporal correlation between two or more receive antennas of the plurality of receive antennas coupled to receiving device 14. According to some examples, receiving device 14 may perform the SOI KF with respect to each received beamformed signal by performing the SOI KF in one of a vector state with a scalar observation mode or a vector state with a vector observation mode. In some examples, receiving device 14 may select one of the vector state with the scalar observation mode or the vector state with the vector observation mode. According to some such examples, receiving device 14 may make the selection based on a number of receive antennas included in the plurality of receive antennas, and one or more spatio-temporal correlation characteristics of the wireless communication channel.

As discussed above, in one example implementation the receiver may include a plurality of receive antennas for receiving communication information, a memory for storing the communication information, and one or more processors for processing the communication information. The one or more processors are configured to receive, through a wireless communication channel, a pilot signal transmitted by a transmitting device. The one or more processors are further configured to determine, based on the received pilot signal, channel state feedback comprising a quantized representation of the pilot signal as received at the receiving device. The one or more processors are further configured to send, through the wireless communication channel, the channel state feedback to the transmitting device Receiver 14 may send the channel state feedback to the transmitting device (706).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

An example system model of the techniques is described below. In reference to FIG. 1, for example, consider a downlink transmit beamforming setting comprising a transmitter with N antennas (e.g. transmitter 12 having antennas 18A-18N) and a receiver with a single receive antenna (e.g., receiver 14 having antenna 28). Extensions to account for multiple receive antennas and multiple receivers are discussed at the end of the discussion of "performance analysis." The system model described herein considers a time-slotted downlink frame structure, where the duration of each slot is T seconds. The system model is based on an assumption that, at the beginning of each time slot n, the transmitter sends a unit-power pilot symbol s(n) that is known at the receiver (i.e., downlink pilot rate is 1/T symbols/s), followed by data transmission for the remainder of the slot duration. The pilot symbol s(n) is beamformed with a unit-norm N×1 beamforming vector w(n) (i.e., the weights applied to the N transmit-antenna elements when transmitting s(n) are the conjugate entries of w(n)), whereas the data symbols are beamformed with a different unit-norm N×1 beamforming vector $\tilde{w}(n)$.

The described system model also assumes that the complex N×1 vector that models the frequency-flat channel between the N transmit-antennas and the receive antenna at time slot n, denoted by h(n), is complex Gaussian distributed with zero mean and covariance matrix $C_h$, i.e., h(n)~CN(0, $C_h$), for all n. The covariance $C_h$ describes the spatial correlation of the channel, and is assumed to be known at the transmitter and the receiver. The channel vector h(n) is assumed to be fixed within time slot n, and the random process {h(n)} is assumed to be stationary, ergodic, and temporally correlated. A simple model for {h(n)}, which allows specifying the temporal correlation of the channel, is the first-order AR model:

$$h(n) = \sqrt{\alpha} h(n-1) + \sqrt{1-\alpha} u(n) \qquad (1)$$

where u(n)~CN(0, $C_h$), h(n−1) is statistically independent of u(n) for all n, and α≤1 controls the degree of temporal correlation of the channel, $\mathbb{E}[h(n)h^H(n-k)] = \alpha^{k/2} C_h$. The AR model of equation (1) may be used to model the temporal progression of the channel. Equation (1) may also be extended to higher orders. The channel is not restricted to the model expressed in equation (1) according to aspects of this disclosure. However, equation (1) is considered for its analytical tractability. As opposed to assumptions in existing techniques, the system model of this disclosure does not assume that the channel is perfectly known at the receiver.

The received signal that corresponds to the transmitted pilot s(n) can be expressed as $$\bar{y}(n) = w^H(n)h(n)s(n) + \bar{v}(n) \qquad (2)$$

where the random variable $\bar{v}(n)$~CN(0, $\sigma_v^2$) models the additive white Gaussian noise (AWGN), and {$\bar{v}(n)$} are independent and identically distributed (i.i.d.). Multiplying the received signal $\bar{y}(n)$ by s*(n) (i.e., de-scrambling) at the receiver yields $$y(n) := s^*(n)\bar{y}(n) = w^H(n)h(n) + v(n) \qquad (3)$$

where v(n)~CN(0, $\sigma_v^2$) and i.i.d.

The receiver then passes y(n) through a quantizer, and the output quantization bits are sent to the transmitter through an uplink feedback channel. A potential challenge at the transmitter is to estimate and track the channel h(n) using such few (periodic) feedback bits. The transmitter then uses the channel estimate $\hat{h}(n)$ to design the beamforming vector that is used for data transmission in time slot n as $$\tilde{w}(n) = \frac{\hat{h}(n)}{\|\hat{h}(n)\|}.$$

Assuming that the data symbols are temporally white with zero-mean and unit-variance, and that the AWGN is zero-mean and unit-variance, the average receive-SNR can be expressed as $\gamma = \mathbb{E}[|\tilde{w}^H(n)h(n)|^2]$. Several design approaches for the pilot beamforming vector w(n) are discussed in Section V, and compared in Section VI. The time-slotted downlink frame structure and the limited feedback beamforming system of the system model are illustrated in FIG. 1.

In the discussion below of analog-amplitude feedback, the case where the receiver feeds back the complex analog-amplitude (or finely-quantized) signal y(n) to the transmitter at each time slot is first considered. This scenario yields a bound on the performance with quantization. Another case (which may be considered more practical) is the case with very limited feedback, where the receiver feeds back only 2 bits to the transmitter at each time slot. This case is considered in the discussion below of 2-bit quantized feedback.

ANALOG-AMPLITUDE FEEDBACK. Aspects of this section assume that the receiver will send the complex analog-amplitude (or finely-quantized) signal y(n) to the transmitter through an uplink feedback channel. Assuming an AR channel model, a KF approach for estimating and tracking h(n) is considered first. This discussion is followed by a minimum mean-square error (MMSE) approach that can be applied for any channel model.

KF Approach.

Assuming an AR channel evolution model as expressed in equation (1), in addition to the linear observation model of y(n) as (3), the transmitter can apply the KF iterations to estimate and track h(n) from $\{y(k)\}_{k=1}^n$ [11, Ch. 13].

Define the vector of observations $y_n := [y(n), y(n-1), \ldots, y(1)]^T$ and the innovation as follows:

$$\check{y}(n) := y(n) - w^H(n)\tilde{h}(n) \quad (4)$$

where $\tilde{h}(n) := \mathbb{E}[h(n)|y_{n-1}]$ is the predicted channel vector, which equals $\sqrt{\alpha}\hat{h}(n-1)$ for the considered AR model. Exploiting that the posterior distribution $p(h(n)|y_n)$ is Gaussian for the linear Gaussian state and observation models considered, the MMSE estimate of h(n) can be recursively obtained by the following KF equations:

$$\hat{h}_{KF}(n) = \mathbb{E}[h(n) \mid y_n] \quad (5)$$

$$= \mathbb{E}[h(n) \mid y_{n-1}] + \mathbb{E}[h(n) \mid y_{n-1}] + \mathbb{E}[h(n) \mid \check{y}(n)]$$

$$= \sqrt{\alpha}\,\hat{h}_{KF}(n-1) + \frac{\tilde{M}(n)w(n)}{w^H(n)\tilde{M}(n)w(n) + \sigma_v^2}\check{y}(n)$$

where the prediction error covariance matrix (ECM) is $$\tilde{M}(n) = \mathbb{E}\big[(h(n) - \tilde{h}(n))(h(n) - \tilde{h}(n))^H\big] \quad (6)$$

$$= \alpha M_{KF}(n-1) + (1-\alpha)C_h$$

and the estimation ECM is $$M_{KF}(n) = \mathbb{E}\big[(h(n) - \hat{h}(n))(h(n) - \hat{h}(n))^H\big] \quad (7)$$

$$= \tilde{M}(n) - \frac{\tilde{M}(n)w(n)w^H(n)\tilde{M}(n)}{w^H(n)\tilde{M}(n)w(n) + \sigma_v^2}$$

For a general (non-AR) channel model, one approach is to approximate the actual channel evolution by the AR model (1), using α that gives the best performance (e.g., α that minimizes the average estimation error or maximizes the average achieved SNR). The performance of this approach is illustrated in Section VI. Next, a different channel tracking approach that does not require a specific channel evolution model is considered.

MMSE Approach. Aspects of this disclosure consider a simple and general approach that does not assume a model for h(n). When estimating h(n) using the current and prior observations $\{y(k)\}_{k=1}^n$, more weight may be given to recent observations, while older observations may be given less weight. In view of exponentially-weighted recursive least-squares (RLS) techniques, on example implementation described herein is based on approximating the set of observations $\{y(k)=w^H(k)h(k)+v(k)\}_{k=1}^n$ with the set $$\left\{y(k) = w^H(k)h(n) + \lambda^{\frac{k-n}{2}}v(k)\right\}_{k=1}^n,$$

where $0 \leq \lambda \leq 1$. The role of the forgetting factor λ is to (e.g., exponentially) increase the noise variance of the older observations, implying more uncertainty in the approximate equality of the linear measurement $y(k)=w^H(k)h(n)$ as n-k increases.

Define the beamforming matrix $W_n := [w(n), w(n-1), \ldots, w(1)]^H$ and the diagonal noise covariance matrix $C_v = \sigma_v^2 \text{diag}([1, \lambda^{-1}, \ldots, \lambda^{-n}])$. Hence, the MMSE estimate of h(n), assuming the linear Gaussian observations $\{y(k)=w^H(k)h(n)+\lambda^{-(n-k)/2}v(k)\}_{k=1}^n$, can be obtained as follows:

$$\hat{h}_{MMSE}(n) = C_h W_n^H (W_n C_h W_n^H + C_v)^{-1} y_n \quad (8)$$

The matrix $C_h W_n^H (W_n C_h W_n^H + C_v)^{-1}$ can be precomputed for each n in order to reduce the run-time computational complexity. Note that, because of the exponential decay, only finite-size matrices $W_n$ and $C_v$ are needed to compute $\hat{h}_{MMSE}(n)$ using (8), as n→∞. The main challenge in this MMSE approach is to find the value of λ that gives the best performance for each channel model. Performance comparisons between the KF approach and the MMSE approach are considered in the discussion of numerical results below, with respect to different channel models.

If h(n) is assumed to be deterministic instead of random, the exponentially-weighted RLS algorithm can be applied to estimate and track h(n) from $\{y(k)\}_{k=1}^n$. Moreover, if second order statistics are available, i.e., $\mathbb{E}[h(n)h^H(n-k)]$ for all k, then a Wiener filtering (WF) technique can be applied. Assuming, for example, that $\mathbb{E}[h(n)h^H(n-k)] = \rho_k C_h$ (where $\rho_0 = 1$ and $\rho_k$ is known for k≥1), the WF channel estimate can be obtained as:

$$\hat{h}_{WF}(n) = C_h \tilde{W}_n^H (W_n C_h W_n^H \odot \Gamma + \tilde{C}_v)^{-1} y_n \quad (9)$$

where $\tilde{C}_v := \sigma_v^2 I$, $\tilde{W}_n := [w(n), \rho_1 w(n-1), \ldots, \rho_n w(1)]^H$ and $\Gamma := \text{Toeplitz}([\rho_0, \rho_1, \ldots, \rho_n])$. Further details of example Wiener filtering (WF) techniques can be found in Chapter 12 of Kay, "Fundamentals of Statistical Signal Processing: Practical Algorithm Development,", 1993, which incorporated herein by reference in its entirety.

2-BIT QUANTIZED FEEDBACK. Sending the complex analog-amplitude (or finely-quantized) signal y(n) via the uplink feedback channel entails a large overhead in terms of the uplink resources (rate, transmit-power). Instead, consider the following 2-bit quantization scheme at the receiver. The KF channel tracking approach in equation (5) depends on the innovation $\check{y}(n)$ defined in equation (4). In other words, the difference between the current observation and the predicted observation based on past observations. Thus, a one-bit quantization for the real part of y̌(n), and a one-bit quantization for the imaginary part y̌(n) are considered. This can be expressed as $$b_r(n) = \text{sign}[\text{Re}\{y(n)\} - d_r(n)] \quad (10)$$

$$b_i(n) = \text{sign}[\text{Im}\{y(n)\} - d_i(n)] \quad (11)$$

where $d_r(n) := \text{Re}\{w^H(n)\bar{h}(n)\}$, $d_i(n) := \text{Im}\{w^H(n)\bar{h}(n)\}$, and $\bar{h}(n)$ is the predicted channel given the past observations. In order to compute $d_r(n)$ and $d_i(n)$ that are required to perform the 2-bit quantization in equation (10) and equation (11), the receiver needs access to the pilot beamforming vector $w(n)$, and must compute $\bar{h}(n)$ in the same way as the transmitter, as discussed in further detail below.

After the quantization, the receiver sends the two bits $b_r(n)$ and $b_i(n)$ to the transmitter via the uplink feedback channel. The feedback channel is assumed to be free of errors. The term 'frugal feedback' is used herein to describe this feedback process, where the term 'frugal' carries a double implication: low on resources (bits in this instance) but judiciously allocated. The quantization of y̌(n) enables the good performance, which is not tenable with 'any two' bits.

Note that with such 2-bit quantization, the downlink pilot rate is only 1/T symbols/s, and the uplink feedback rate is only 2/T bits/s. A potential challenge here is whether the transmitter can accurately estimate and track the complex N-dimensional channel h(n), using only the periodically received pairs of feedback bits $b_r(n)$ and $b_i(n)$. To address this potential challenge, techniques of this disclosure take into consideration a SOI-KF approach that is suitable for the AR channel model, followed by a MAP approach that is applicable for general channel models. Aspects of the SOI-KF approach are discussed in Ribeiro et al, "SOI-KF: distributed Kalman filtering with low-cost communications using the sign of innovations," Transactions on Signal Processing Vol. 54, No. 12, pp. 4782-4795, which is incorporated herein by reference in its entirety.

SOI-KF Approach.

According to the sign of innovation—Kalman filtering (SOI-KF) approach described herein, it is assumed that the AR channel model in equation (1), and the binary observation model given by equation (10) and equation (11), where $\bar{h}(n) = \sqrt{\alpha}\hat{h}(n-1)$ for the AR model. To estimate and track h(n) at the transmitter using $\{b_r(k)\}_{k=1}^n$ and $\{b_i(k)\}_{k=1}^n$, the techniques described herein may extend the SOI-KF framework from the real vector space to the complex vector space. To facilitate operating in the more convenient real domain, consider the following definitions:

$$b_n := [b_r(1), \ldots, b_r(n), b_i(1), \ldots, b_i(n)]^T,$$

$$w_r(n) := [\text{Re}\{w(n)\}^T, \text{Im}\{w(n)\}^T]^T,$$

$$w_i(n) := [-\text{Im}\{w(n)\}^T, \text{Re}\{w(n)\}^T]^T,$$

$$\bar{h}(n) := [\text{Re}\{h(n)\}^T, \text{Im}\{h(n)\}^T]^T,$$

$$\bar{C}_h := \mathbb{E}[\bar{h}(n)\bar{h}(n)^H]$$

such that $\text{Re}\{w^H(n)h(n)\} = w_r^T(n)\bar{h}(n)$ and $\text{Im}\{w^H(n)h(n)\} = w_i^T(n)\bar{h}(n)$.

The distribution $p(\bar{h}(n)|b_n)$ is not necessarily Gaussian because the binary observation model is not linear, and hence the exact MMSE estimator, i.e., $\mathbb{E}[h(n)|b_n]$, requires multiple nested numerical integrations to compute the posterior distribution $p(\bar{h}(n)|b_n)$. Assuming that $p(\bar{h}(n)|b_{n-1}) = N(\sqrt{\alpha}\hat{h}(n-1), \check{M}(n))$, and utilizing the corresponding results discussed in Ribeiro, the MMSE estimate $\hat{h}_{SOI-KF}(n) := \mathbb{E}[\bar{h}(n)|b_n]$ can be obtained using the following KF-like recursive equations:

$$\hat{h}_{SOI-KF}(n) = \sqrt{\alpha}\,\hat{h}_{SOI-KF}(n-1) + \quad (12)$$

$$\frac{\sqrt{2/\pi}\,\check{M}(n)w_r(n)b_r(n)}{\sqrt{w_r^T(n)\check{M}(n)w_r(n) + \sigma_v^2/2}} + \frac{\sqrt{2/\pi}\,\overline{M}(n)w_i(n)b_i(n)}{\sqrt{w_i^T(n)\overline{M}(n)w_i(n) + \sigma_v^2/2}}$$

where $$\check{M}(n) = \alpha M_{SOI-KF}(n-1) + (1-\alpha)\bar{C}_h. \quad (13)$$

$$\overline{M}(n) = \check{M}(n) - \frac{(2/\pi)\check{M}(n)w_r(n)w_r^T(n)\check{M}(n)}{w_r^T(n)\check{M}(n)w_r(n) + \sigma_v^2/2} \quad (14)$$

$$M_{SOI-KF}(n) = \overline{M}(n) - \frac{(2/\pi)\overline{M}(n)w_i(n)w_i^T(n)\overline{M}(n)}{w_i^T(n)\overline{M}(n)w_i(n) + \sigma_v^2/2} \quad (15)$$

There are two underlying assumptions in the SOI-KF approach described herein. The two underlying assumptions are: 1. The actual channel model follows an AR model; and 2. The distribution $p(h(n)|b_{n-1})$ is Gaussian. Relaxing both assumptions, this disclosure next develops a MAP estimation and tracking approach that does not assume a specific channel evolution model, and which can yield superior performance relative to the SOI-KF approach, as will be shown in the simulations described below.

2-Bit MAP Approach.

The 2-bit MAP approach takes into consideration the same exponential weighting idea that is used in the MMSE Approach described herein, where the set of measurements $\{y(k) = w^H(k)h(n) + v(k)\}_{k=1}^n$ is approximated and replaced with the set $$\left\{y(k) = w^H(k)h(n) + \lambda^{\frac{k-n}{2}}v(k)\right\}_{k=1}^n$$

for $0 \leq \lambda \leq 1$. Using this assumption, techniques of this disclosure may be applied to formulate a MAP estimation problem for h(n), given the 2n measurement bits $\{b_r(k)\}_{k=1}^n$ and $\{b_i(k)\}_{k=1}^n$. Note that without assuming a specific channel model, the predicted channel can be taken to be the same as its most recent estimate, i.e., $\bar{h}(n) = \hat{h}(n-1)$.

The probability that $b_r(k)=1$ (and similarly for the probability that $b_i(k)=1$) at time slot n given h(n) can be expressed in terms of the Q-function as $$p[b_r(k) = 1 | \bar{h}(n)] \quad (16)$$

$$= p\left[w_r^T(k)\bar{h}(n) + \lambda^{\frac{k-n}{2}}\text{Re}\{v(k)\} \geq d_r(k)\right]$$

$$= Q\left(\frac{d_r(k) - w_r^T(k)\bar{h}(n)}{\sigma_n(k)}\right)$$

where $$\sigma_n(k) := \lambda^{\frac{k-n}{2}}\sigma_v/\sqrt{2}.$$

Since the noise samples $\{v(k)\}_{k=1}^n$ are independent, the probability mass function (PMF) of $b_n$, given $\bar{h}(n)$, is given as $$p[b_n \mid \overline{h}(n)] = \prod_{k=1}^{n} Q\left(\frac{-b_r(k)(w_r^T(k)\overline{h}(n) - d_r(k))}{\sigma_n(k)}\right) \quad (17)$$

$$\prod_{k=1}^{n} Q\left(\frac{-b_i(k)(w_i^T(k)\overline{h}(n) - d_i(k))}{\sigma_n(k)}\right)$$

Now the MAP estimate can be obtained as $$\hat{h}_{MAP}(n) = \underset{\overline{h}(n)}{\arg\max}\, p[b_n \mid \overline{h}(n)]p[\overline{h}(n)] \quad (18)$$

$$= \underset{\overline{h}(n)}{\arg\max} \sum_{k=1}^{n} \left[\log Q\left(\frac{-b_r(k)(w_r^T(k)\overline{h}(n) - d_r(k))}{\sigma_n(k)}\right)\right] +$$

$$\log Q\left(\frac{-b_i(k)(w_i^T(k)\overline{h}(n) - d_i(k))}{\sigma_n(k)}\right) -$$

$$\frac{1}{2}\overline{h}(n)^T \overline{C}_h^{-1} \overline{h}(n)$$

Since the Q-function is log-concave, problem (18) is convex and can be solved efficiently using Newton's method. Newton's method is discussed in further detail in section 9.5 of Boyd et al, "Convex Optimiation," Cambridge, U.K.: Cambridge Univ. Press, 2004, which is incorporated herein by reference in its entirety.

In Newton's method, defining the function $\Phi_n(x)$ as the negative of the objective function in equation (18) (defined explicitly in equation (20) below), and starting from a feasible initial point x, multiple damped Newton steps of type are used to find the minimizer of the convex function $\Phi_n(x)$ (where $\beta \geq 0$ is the step-size). Closed form expressions for the gradient vector $\nabla \omega_n(x)$ and the Hessian matrix $\nabla^2 \Phi_n(x)$ are derived in equation (21) and equation (22), respectively.

$$x = x = \beta(\nabla^2 \Phi_n(x))^{-1} \nabla \Phi_n(x) \quad (19)$$

$$\Phi_n(x) := \sum_{k=1}^{n} \left[\log Q\left(\frac{-b_r(k)(w_r^T(k)x - d_r(k))}{\sigma_n(k)}\right) + \log Q\left(\frac{-b_i(k)(w_i^T(k)x - d_i(k))}{\sigma_n(k)}\right)\right] + \frac{1}{2} x^T \overline{C}_h^{-1} x \quad (20)$$

$$\nabla \Phi_n(x) = -\sum_{k=1}^{n} \frac{1}{\sqrt{2\pi\sigma_n^2(k)}} \left[\frac{b_r(k)e^{-\frac{(w_r^T(k)x - d_r(k))^2}{2\sigma_n^2(k)}}}{Q\left(\frac{-b_r(k)(w_r^T(k)x - d_r(k))}{\sigma_n(k)}\right)} w_r(k) + \frac{-b_i(k)e^{-\frac{(w_i^T(k)x - d_i(k))^2}{2\sigma_n^2(k)}}}{Q\left(\frac{-b_i(k)(w_i^T(k)x - d_i(k))}{\sigma_n(k)}\right)} w_i(k)\right] + \overline{C}_h^{-1} x \quad (21)$$

-continued $$\nabla^2 \Phi_n(x) = \sum_{k=1}^{n} \left[\frac{e^{-\frac{(w_r^T(k)x - d_r(k))^2}{\sigma_n^2(k)}}}{2\pi\sigma_n^2(k)\left[Q\left(\frac{-b_r(k)(w_r^T(k)x - d_r(k))}{\sigma_n(k)}\right)\right]^2} + \frac{-b_r(k)(w_r^T(k)x - d_r(k))e^{-\frac{(w_r^T(k)x - d_r(k))^2}{2\sigma_n^2(k)}}}{\sqrt{2\pi}\,\sigma_n^3(k)Q\left(\frac{-b_r(k)(w_r^T(k)x - d_r(k))}{\sigma_n(k)}\right)}\right] w_r(k)w_r^T(k) +$$

$$\sum_{k=1}^{n} \left[\frac{e^{-\frac{(w_i^T(k)x - d_i(k))^2}{\sigma_n^2(k)}}}{2\pi\sigma_n^2(k)\left[Q\left(\frac{-b_i(k)(w_i^T(k)x - d_i(k))}{\sigma_n(k)}\right)\right]^2} + \frac{-b_i(k)(w_i^T(k)x - d_i(k))e^{-\frac{(w_i^T(k)x - d_i(k))^2}{2\sigma_n^2(k)}}}{\sqrt{2\pi}\,\sigma_n^3(k)Q\left(\frac{-b_i(k)(w_i^T(k)x - d_i(k))}{\sigma_n(k)}\right)}\right] w_i(k)w_i^T(k) + \overline{C}_h^{-1} \quad (22)$$

In order to reduce the complexity of solving (18) exactly, we consider applying only a single iteration of Newton's method (with unit-step $\beta=1$) to obtain $\hat{h}(n)$, using $\hat{h}(n-1)$ as the initial point. The proposed low-complexity approximate MAP (AMAP) estimate can be expressed as $$\hat{h}_{AMAP}(n) = \hat{h}_{AMAP}(n-1) - (\nabla^2 \Phi_n(\hat{h}_{AMAP}(n-1)))^{-1} \nabla \Phi_n(\hat{h}_{AMAP}(n-1)) \quad (23)$$

Intuitively, when the channel is tracked well, the actual channel h(n) at time n is very close to the estimated channel $\hat{h}_{AMAP}$ (n−1) at time n−1, hence a single Newton step is sufficient to obtain a close approximation of the exact MAP estimate (18). For the rest of this paper, references to the 2-bit MAP approach will mean the AMAP in equation (23), and not the exact MAP in equation (18).

The complexity of computing $\hat{h}_{AMAP}$ (n) using equation (23) is determined by computing and inverting the 2N×2N Hessian matrix $\nabla^2 \Phi_n(\hat{h}_{AMAP}(n-1))$. Note that because of the exponential increase of $\sigma_n(k)$ as n−k increases, the number of measurement bits that are required to compute $\nabla^2 \Phi_n(\hat{h}_{AMAP}(n-1))$ and $\nabla \Phi_n(\hat{h}_{AMAP}(n-1))$ (and the corresponding terms in the summation), as n→∞, are finite. The 2-bit MAP approach is computationally more complex than the SOI-KF approach. However, the performance of the 2-bit MAP approach can be better than that of the SOI-KF approach, as shown in the numerical results. It is also worth mentioning that, in terms of applications, the proposed 2-bit MAP approach is not restricted to channel tracking. Rather, the 2-bit MAP approach can be used for general estimation and tracking problems with (very) limited feedback.

PERFORMANCE ANALYSIS. Performance of the channel tracking schemes disclosed herein depends on the actual channel model and the choice of pilot beamforming vectors {w(n)}. For purposes of illustration, the discussion of performance analysis below focuses attention on the analytically tractable AR channel model of equation (1).

A "greedy" beamforming design strategy for the KF approach is to use the beamforming vector w(n) that minimizes Trace $(M_{KF}(n))$ at time n. From equation (7), the optimization problem can be expressed as $$w(n) = \arg \max_{w, s.t. \|w\|^2 = 1} \text{Trace}\left(\frac{\tilde{M}(n)ww^H \tilde{M}(n)}{w^H \tilde{M}(n)w + \sigma_v^2}\right) \quad (24)$$

The objective function in equation (24) can be expressed as a Rayleigh quotient as $$\text{Trace}\left(\frac{\tilde{M}(n)ww^H\tilde{M}(n)}{w^H\tilde{M}(n)w + \sigma_v^2}\right) = \frac{w^H\tilde{M}^2(n)w}{w^H(\tilde{M}(n)w + \sigma_v^2 I)w} = \frac{z^H B^{-1/2}\tilde{M}^2(n)B^{-1/2}z}{z^H z} \quad (5)$$

where $B = \tilde{M}(n) + \sigma_v^2 I$ and $z = B^{1/2}w$. The optimal z that maximizes the Rayleigh quotient $$\frac{z^H E z}{z^H z},$$

where $E := B^{-1/2}\tilde{M}^2(n)B^{-1/2}$, is the eigenvector that corresponds to the maximum eigenvalue of E, denoted $z^*$. Then the optimal beamforming vector solution to equation (24) is obtained according to the formula $$w(n) = \frac{B^{-1/2}z^*}{\|B^{-\frac{1}{2}}z^*\|}.$$

The greedy beamforming approach discussed above may not guarantee yielding the best overall estimation/tracking performance for more than one time slot. As discussed in further detail below, via simulations, a different simple beamforming scheme can outperform this greedy beamforming approach, when the channel is spatially correlated (i.e., $C_h$ is not a diagonal matrix). If $C_h = \sigma_h^2 I$, and the initial ECM $M_{KF}(0) = vI$, $v \geq 0$, the greedy optimization of equation (24) selects a single antenna for each n, with different antennas selected in a round-robin fashion, i.e., the i-th entry of w(n) is 1 if mod(n, N)+1=i and 0 otherwise. In various portions of this disclosure, this beamforming scheme is referred to as "single-antenna beamforming."

The following proposition gives a closed-form expression for the channel estimation MSE with the KF and SOI-KF approaches (for sufficiently large n), using single-antenna beamforming, and assuming that $C_h = \sigma_h^2 I$.

Proposition 1:

This proposition considers the AR channel model of equation (1), the linear observation model of equation (3), the single-antenna beamforming scheme, and assumes that $C_h = \sigma_h^2 I$ (and that the distribution $p(h(n)|b_{n-1})$ is Gaussian for the SOI-KF approach). Then, $$\varepsilon_{KF} := \lim_{n\to\infty} \text{Trace}(M_{KF}(n)) \quad (25)$$

$$= N\sigma_h^2 - \left(\sigma_h^2 - \left(\sqrt{c_1^2 + c_2} - c_1\right)\right)\frac{1-\alpha^N}{1-\alpha}$$

$$\varepsilon_{SOI-KF} := \lim_{n\to\infty} \text{Trace}(M_{SOI-KF}(n)) \quad (26)$$

$$= N\sigma_h^2 - \left(\sigma_h^2 - \left(\frac{\sqrt{c_4^2 + c_3 c_5} - c_4}{c_3}\right)\right)\frac{1-\alpha^N}{1-\alpha}$$

where $$c_1 = (1-\alpha^N)(\sigma_h^2 + \sigma_v^2)/2\alpha^N,$$

-continued $$c_2 = (1-\alpha^N)\sigma_h^2 \sigma_v^2/\alpha^N,$$

$$c_3 = \alpha^N - \alpha^{2N}\left(1 - \frac{2}{\pi}\right),$$

$$c_4 = \frac{\sigma_v^2}{2}(1-\alpha^N) + \frac{\sigma_h^2}{2}(1-\alpha^N)\left(1 - 2\alpha^N\left(1 - \frac{2}{\pi}\right)\right),$$

$$c_5 = \sigma_v^2 \sigma_h^2(1-\alpha^N) + \sigma_h^4(1-\alpha^N)^2\left(1 - \frac{2}{\pi}\right).$$

Proof 1: See Appendix A. Remark 1: Note that analogous closed-form results are not available for general KF or SOI-KF; what allows these results here is the specific choice of pilot beamforming strategy (single-antenna beamforming), which, as will be shown in the simulations, also happens to provide the most favorable results among several alternatives that were simulated.

Using the same assumptions as Proposition 1, and the relations $e(n) := h(n) - \hat{h}_{KF}(n)$, where $\mathbb{E}[e(n)] = 0$, $\mathbb{E}[\|e(n)\|^2] = $ Trace $(M_{KF}(n))$, $\mathbb{E}[\hat{h}_{KF}^H(n)e(n)] = 0$ (orthogonality principle), and $\mathbb{E}[\|h(n)\|^2] = N\sigma_h^2 = \mathbb{E}[\|\hat{h}_{KF}^H(n)\|^2] + \mathbb{E}[\|e(n)\|^2]$, a lower bound on the average achieved SNR with the KF approach for large n can be obtained as $$\gamma_{KF} := \lim_{n\to\infty}\mathbb{E}\left[\frac{|\hat{h}_{KF}^H(n)h(n)|^2}{\|\hat{h}_{KF}(n)\|^2}\right] \quad (27)$$

$$= \lim_{n\to\infty}\mathbb{E}\left[\|\hat{h}_{KF}(n)\| + \frac{\hat{h}_{KF}^H(n)e(n)}{\|\hat{h}_{KF}(n)\|}\right]^2$$

$$\lim_{n\to\infty}\mathbb{E}[\|\hat{h}_{KF}(n)\|^2] + \lim_{n\to\infty}\mathbb{E}\left[\frac{|\hat{h}_{KF}^H(n)e(n)|^2}{\|\hat{h}_{KF}(n)\|^2}\right]$$

$$\sin\psi(n) := \lim_{n\to\infty}\mathbb{E}\left[\frac{|\hat{h}_{KF}^H(n)e(n)|^2}{\|\hat{h}_{KF}(n)\|^2}\right] \geq$$

0. Denoting the i-th entry of $\hat{h}_{KF}(n)$ as $\alpha_i$ for brevity, $$\lim_{n\to\infty}\psi(n) = \lim_{n\to\infty}\mathbb{E}\left[\frac{|\sum_{i=1}^N \alpha_i^* e_i(n)|^2}{\sum_{i=1}^N |\alpha_i|^2}\right] \quad (28)$$

$$= \lim_{n\to\infty}\mathbb{E}\left[\frac{|\sum_{i=1}^N |\alpha_i|^2 e_i(n)|^2}{\sum_{i=1}^N |\alpha_i|^2}\right]$$

$$\approx \varepsilon_{KF}/N$$

where the last approximation step in equation (28) is obtained assuming that $\hat{h}_{KF}^H(n)$ and e(n) are independent (they are uncorrelated but not necessarily independent). Hence $\gamma_{KF}$ can be closely approximated as and a close approximation is obtained as $$\gamma_{KF} \approx N\sigma_h^2 - \left(\frac{N-1}{N}\right)\varepsilon_{KF} \quad (29)$$

Similarly, a lower bound on the average achieved SNR with the SOI-KF approach at large n can be obtained as $$\gamma_{SOI-KF} := \lim_{n\to\infty}\mathbb{E}\left[\frac{|\hat{h}_{SOI-KF}^H(n)h(n)|^2}{\|\hat{h}_{SOI-KF}(n)\|^2}\right] \geq N\sigma_h^2 - \varepsilon_{SOI-KF} \quad (30)$$

and a close approximation is obtained as $$\gamma_{SOI-KF} \approx N\sigma_h^2 - \left(\frac{N-1}{N}\right)\varepsilon_{SOI-KF} \quad (31)$$

The approximations of equations (29) and (31), are evaluated in the discussion of "numerical results" below.

According to proposition 1, it can be verified that if $\alpha \to 1$ (i.e., the channel is time-invariant), then $\varepsilon_{KF}$, $\varepsilon_{SOI-KF} \to 0$ and $\gamma_{KF}$, $\gamma_{SOI-KF} \to N\sigma_h^2$. In other words, if the channel is time-invariant, then the estimation error will go to zero, and the average SNR will reach the case with perfect CSI at the transmitter, as $n \to \infty$. According to proposition 1, it is also possible to check the behavior of $\varepsilon_{KF}$ and $\varepsilon_{SOI-KF}$ as a function of N, $\sigma_h^2$, and $\sigma_v^2$. An empirical observation made in the simulations discussed herein is as follows:

Trace($M_{KF}(n)$) converges to the limit in equation (25) for $n \geq 2N$, while Trace($M_{SOI-KF}(n)$) converges to the limit in equation (26) for $n \geq 4N$.

A generalization to single-antenna beamforming is the case where the beamforming vector w(n) is selected as one of the columns of a N×N unitary matrix U in a round-robin fashion, i.e., w(n) is the i-th column of U if mod (n, N)+1=i. This scheme is referred to at portions of this disclosure as "unitary beamforming," and single-antenna beamforming may be considered a special case of unitary beamforming with U=I. Based on several numerical tests, the closed-form expressions for $\varepsilon_{KF}$ and $\varepsilon_{SOI-KF}$ in (25) and (26), respectively, may also be applicable for the general case of unitary beamforming, using any unitary matrix U. Moreover, the unitary beamforming scheme could possibly represent the optimal approaching terms of minimizing $\varepsilon_{KF}$ and $\varepsilon_{SOI-KF}$ (and maximizing $\gamma_{KF}$ and $\gamma_{SOI-KF}$), if $C_h = \sigma_h^2 I$.

Intuitively, the beamforming vectors that are used for learning/tracking the channel may provide complementary views of the entire channel vector h(n). For example, the N×N matrix [w(n), w(n)−1, . . . , w(n−N+1)] should be full-rank if $C_h = \sigma_h^2 I$. Thus, the beamforming vectors {w(n)} that are used for pilots {s (n)} for channel tracking should be different from the beamforming vectors {$\tilde{w}$(n)} that are used for data transmission. Choosing $$w(n) = \{\tilde{w}(n)\} = \frac{\hat{h}(n)}{\|\hat{h}(n)\|}$$

yields poor performance. This point is further elaborated in the discussion of numerical results below.

A. Comparing with Codebook-Based Beamforming.

As discussed above, the state-of-the-art in transmit beamforming with limited feedback is focused on designing a common beamformer codebook (known at the transmitter and the receiver). The setup assumes that the receiver will accurately estimate the downlink channel, search the codebook, and feedback the index of the best beamformer in the codebook to the transmitter [2]. In [6], it is stated that for beamforming over i.i.d. Rayleigh fading channels with beamformer codebook of size $2^B$ designed by the GLA, the achieved average SNR $\gamma_{LA}$ can be closely approximated as $$\gamma_{LA} = N\sigma_h^2 - (N-1)\sigma_h^2 2^{-B/(N-1)} \quad (32)$$

Equation (32) is obtained ignoring the temporal correlation of the channel and assuming perfect CSI at the receiver (unlike the case for $\gamma_{SOI-KF}$).

Figure 5:
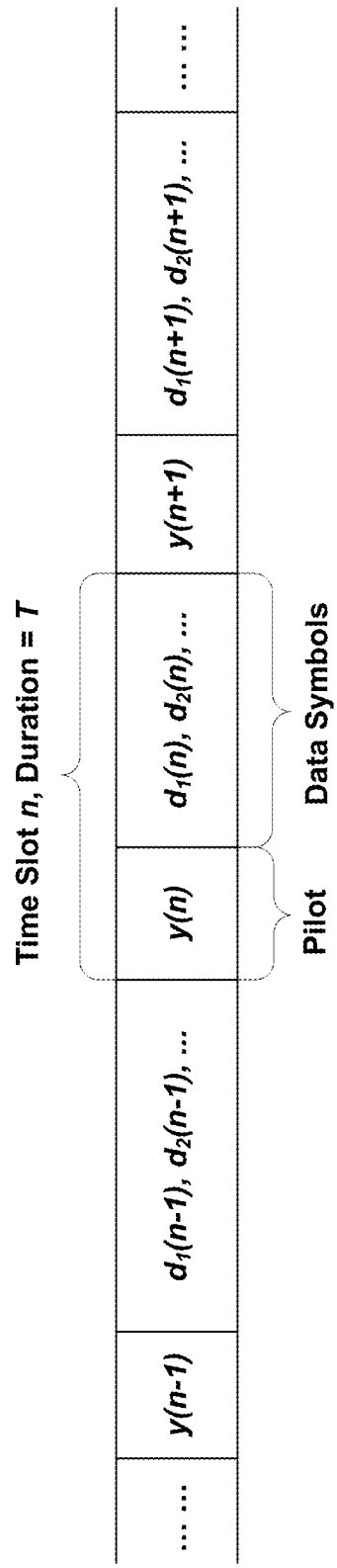
FIG. 5 is a conceptual diagram illustrating an example downlink frame structure in accordance with one or more aspects of this disclosure.

FIG. 5 is a conceptual diagram illustrating an example downlink frame structure in accordance with one or more aspects of this disclosure. The downlink frame structure illustrated in FIG. 5 may be used in accordance with a limited feedback beamforming system model, such as simplified wireless communication system 10 illustrated in FIG. 1.

Figure 6:
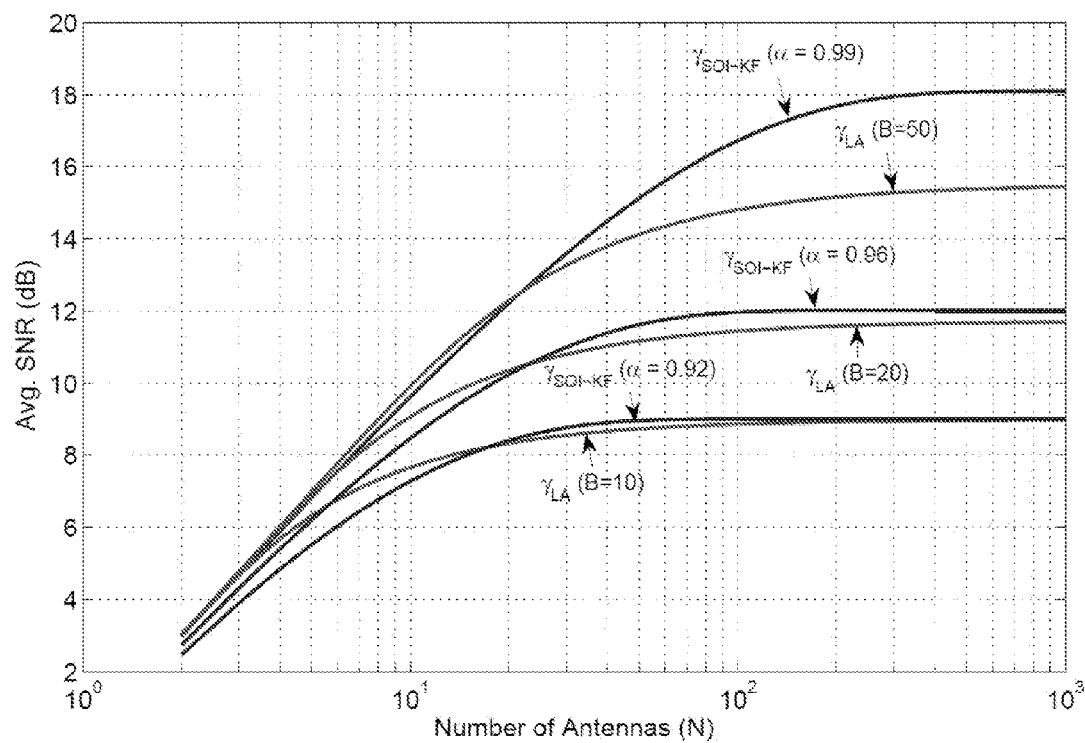
FIGS. 6-11 are graphs that plot signal-to-noise ratio (SNR) loss against a number of antennas, with respect to various techniques of this disclosure.

FIGS. 6-11 are graphs that plot signal-to-noise ratio (SNR) loss against a number of antennas, with respect to various techniques of this disclosure. FIG. 6 plots the lower bound on $\gamma_{SOI-KF}$ from (30) and $\gamma_{LA}$ from (32) as N increases, assuming $C_h = I$, $\sigma_v^2 = 0.001$, $\alpha \in \{0.92, 0.96, 0.99\}$, and $B \in \{10, 20, 50\}$. FIG. 6 shows the increase of $\gamma_{SOI-KF}$ as N increases and as $\alpha$ increases (i.e., channel becomes more correlated across time). FIG. 6 also shows that a large number of feedback bits B(i.e., large codebook) may be required for codebook-based beamforming to achieve the same performance as the SOI-KF approach, which is obtained using only two (2) feedback bits per channel dwell time block of length T The number of bits B required for $\gamma_{LA}$ to achieve $\gamma_{SOI-KF}$ increases as N or $\alpha$ increases. For example, FIG. 6 shows that $\gamma_{SOI-KF}$ (with $\alpha = 0.99$) outperforms $\gamma_{LA}$ with B=10 feedback bits for N≥3, and outperforms $\gamma_{LA}$ with B=50 feedback bits for N≥22.

Exploiting the channel temporal correlation to reduce the feedback rate may enable modeling the quantized CSI at the receiver using a finite-state Markov chain. As shown in FIG. 6, at least B=50 bits are needed to achieve the same SNR performance that is achieved with only 2 feedback bits using the SOI-KF approach when N=20 and $\alpha = 0.99$, for example. This means that at least $2^{50}$ (or 2^50) Markov states need to modeled and $2^{100}$ transition probabilities must be computed in order to apply the compression techniques, which may be computationally prohibitive.

Two practice-oriented remarks are presented herein, prior to a discussion of the numerical results.

Variable-Length Quantization.

To further decrease the feedback rate to 1 bit per T, the receiver can send only the bits that correspond to the real measurements, {$b_r(n)$}, in even time slots, while the bits that correspond to the imaginary measurements, {$b_i(n)$}, are sent in odd time slots (or vice versa). On the other hand, the estimation performance can be improved by increasing the feedback quantization bits (at the potential cost of higher feedback rate) using iteratively quantized Kalman filter techniques, where the quantization bits are iteratively formed using the sign of the difference between the observation y(n) and its estimate based on past observations along with previous bits of the current observation.

Multiple receive antennas. Extending this work to a setting with more than one receive antennas (or multiple receivers) is straightforward if the receive antennas are uncorrelated. A separate estimation/tracking problem can be set up for the channel vector that corresponds to each receive antenna.

NUMERICAL RESULTS. To test the performance of the proposed beamforming and feedback techniques, in FIGS. 7-10 take into consideration a model referred to herein as "the Jakes' channel model" or "Jakes' model." Jakes' model is described in further detail in William C. Jakes, "Microwave Mobile Communications," New York: John Wiley and Sons, 1974, which is incorporated herein by reference in its entirety. According to Jakes' model, the spatio-temporal correlation matrix can be expressed as $[h(n)h^H(n-k)] = \rho_k C_h$, for $k \geq 0$, where $\rho_k := J_0(2\pi f_d T k)$, $J_0$ is the 0-th-order Bessel function, and $f_d$ denotes the Doppler frequency. The unitary beamforming scheme that is described in the discussion of "performance analysis" is used for all figures. The SNR loss, defined as the ratio of the average SNR achieved with perfect CSI at the transmitter (i.e., $\mathbb{E}[\|h(n)\|^2]$) to the average SNR achieved with the estimated channel $$\left(\text{i.e., } \mathbb{E}\left[\frac{|\hat{h}^H(n)h(n)|^2}{\|\hat{h}(n)\|^2}\right]\right),$$

is used to measure and compare the performance of the proposed techniques.

Figure 7:
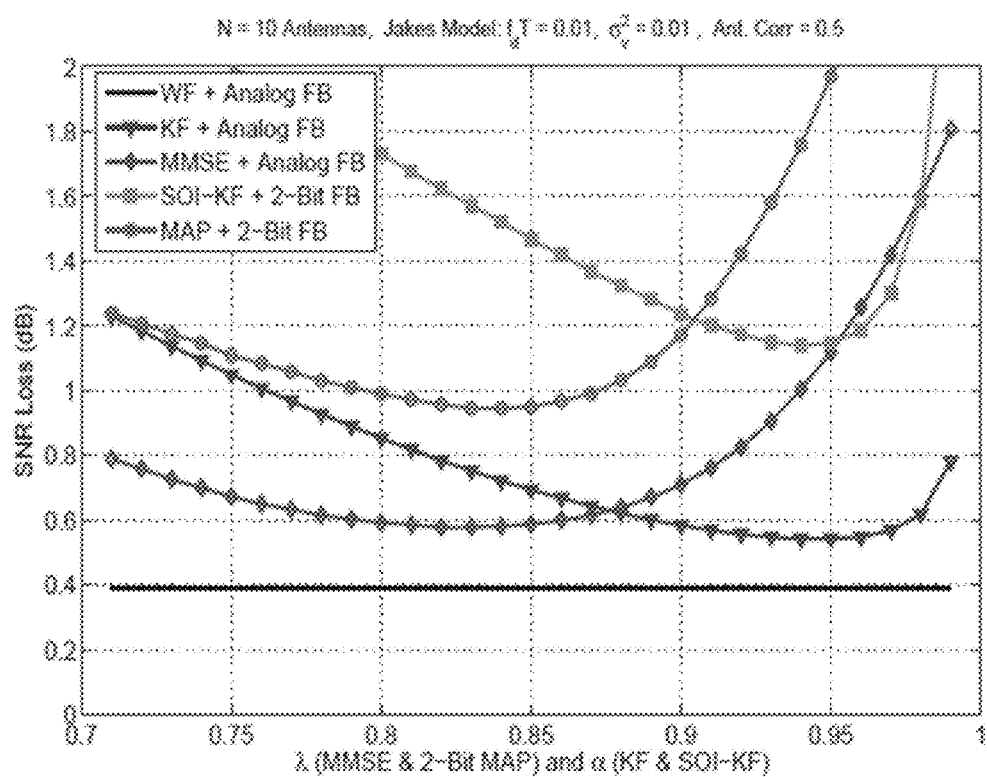

The setup for FIG. 7 considers a transmitter with N=10 antennas, Doppler frequency $f_d$=10 Hz, time slot duration T=1 ms (same performance for any values of $f_d$ and T that satisfy $f_d T$=0.01), spatial correlation matrix $C_h = \sigma_h^2$ Toeplitz $[0.5^0, 0.5^1, \ldots, 0.5^9]$, where $\sigma_h^2$=0.1, and observation noise variance σ2 v=0.01. FIG. 7 illustrates the trade-off between the SNR loss of the KF and SOI-KF approaches and α, the trade-off between the SNR loss of the MMSE and 2-bit MAP approaches and the forgetting factor λ, and the SNR loss using the WF (9) (which may require additional knowledge of $\rho_k = J_0(2\pi f_d Tk)$ for all k) as a baseline. The SNR loss plots are obtained via 1000 Monte-Carlo simulation runs, where each run includes 400 time slots.

Additionally, FIG. 7 shows that the difference between the average receive-SNR achieved using the proposed 2-bit MAP approach with only two (2) feedback bits every T seconds (at the optimal λ*=0.83), and the Genie receive-SNR achieved with perfect CSI at the transmitter, is less than 1 dB. FIG. 7 also shows that the average receive-SNR achieved using the proposed 2-bit MAP approach (at λ*=0.83) is 0.2 dB larger than that achieved using the SOI-KF approach (at α*=0.94), and is only 0.6 dB less than that achieved using WF (9). In other words, the cost of quantizing the received signal y(n) into two (2) feedback bits, as compared to the analog-amplitude y(n) feedback, is less than 0.6 dB. In the case of analog-amplitude feedback, it is assumed that y(n) is perfectly known at the transmitter (in addition to the knowledge of $\{\rho_k\}$); accounting for additional uplink (or quantization) errors in the analog feedback case will further decrease the 0.6 dB difference. Another observation from FIG. 7 is that the MMSE approach (at λ*=0.83) and the KF approach (at α*=0.94) are close in terms of performance. In practice, the optimal values of α or λ for a range of channel models can be pre-computed offline and stored in a lookup table. At run-time, using the current channel statistics or estimated channel parameters (e.g., Doppler frequency), a suitable value of α or λ can be retrieved from the lookup table and applied in the channel tracking algorithm, without performing any expensive computations.

Table I below uses the same setup as FIG. 7, and reports the SNR loss (in dB) with different beamforming schemes at λ*=0.83 and α*=0.94. The considered beamforming schemes, which correspond to the columns of Table 1, are (in left-to-right order): (i) the unitary beamforming scheme described above with respect to performance analysis; (ii) the single-antenna beamforming scheme described above with respect to performance analysis; (iii) a random beamforming scheme where w(n) is a normalized Gaussian random vector for each n; (iv) the greedy beamforming scheme where w(n) is obtained by solving equation (24); and (v) the case where w(n) corresponds to the most recent channel estimate using the KF approach (i.e., $w(n) = \hat{h}_{KF}(n-1)/\|\hat{h}_{KF}(n-1)\|$). Table 1 shows that the performance of the unitary beamforming is almost identical to that of the single-antenna beamforming (with a small difference within the sample averaging error), which is superior to other considered beamforming schemes. Table 1 also verifies that the greedy beamforming scheme using equation (24) may not be optimal, and that using $w(n) = \hat{h}_{KF}(n-1)/\|\hat{h}_{KF}(n-1)\|$ yields poor performance, as discussed above with respect to performance analysis.

TABLE 1

|  | Unitary | Single-Ant. | Random | Greedy | KF Est. |
| --- | --- | --- | --- | --- | --- |
| WF | 0.39 | 0.39 | 0.60 | 0.84 | 3.29 |
| KF | 0.54 | 0.54 | 0.83 | 0.96 | 4.24 |
| MMSE | 0.57 | 0.58 | 0.92 | 1.07 | 4.79 |
| SOI-KF | 1.14 | 1.10 | 1.40 | 1.42 | 4.45 |
| 2-Bit MAP | 0.94 | 0.92 | 1.19 | 1.27 | 4.04 |

Figure 8:
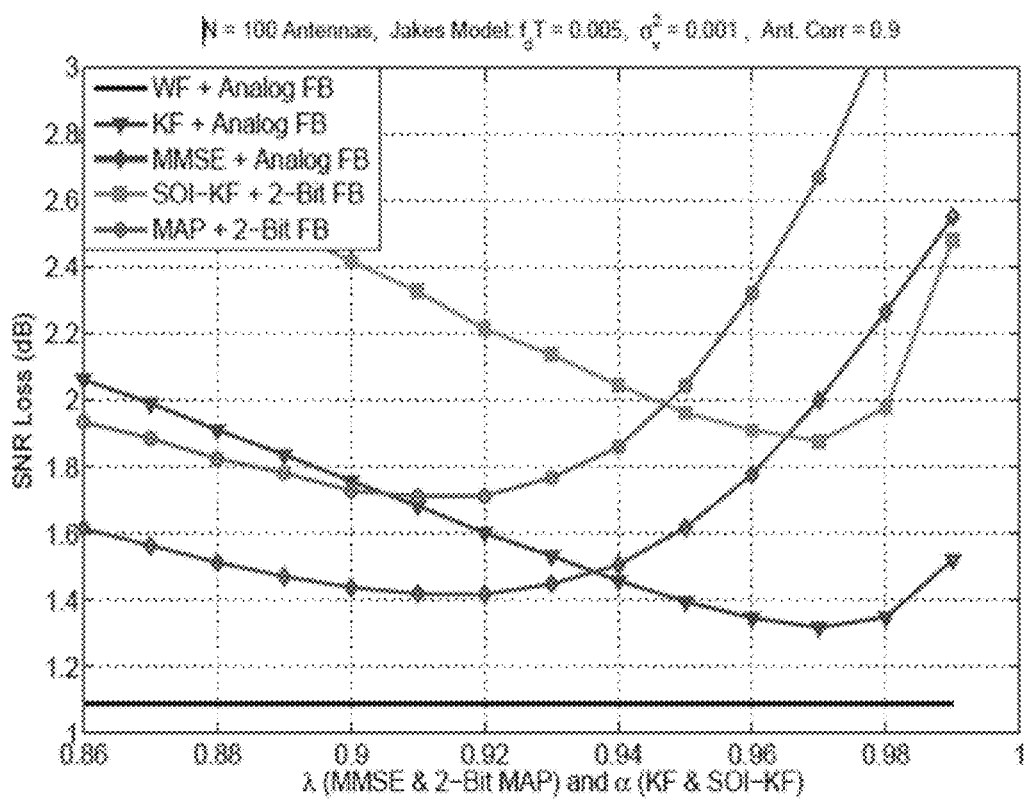

FIG. 8 illustrates a large system with N=100 antennas, with Doppler frequency $f_d$=5 Hz, spatial correlation matrix $C_h = \sigma_h^2$ Toeplitz $([0.9^0, 0.9^1, \ldots, 0.9^{99}])$, where $\sigma_h^2$=0.01, and observation noise variance $\sigma_v^2$=0.001. Similar to FIG. 7, FIG. 8 illustrates the trade-off between the SNR loss and the parameters λ and α, and confirms that the proposed 2-bit MAP approach with only 2 feedback bits every T seconds is applicable even with large N. At the optimal λ*=0.91, the SNR achieved with 2-bit MAP approach is 1.7 dB less than the case with perfect CSI at the transmitter, 0.6 dB less than WF with analog-signal feedback, and 0.2 dB higher than the SOI-KF approach (at the optimal α*=0.97). The results shown in FIG. 8 help pave the way for using massive MIMO systems in FDD mode, by exploiting the high spatio-temporal channel correlation.

Figure 9:
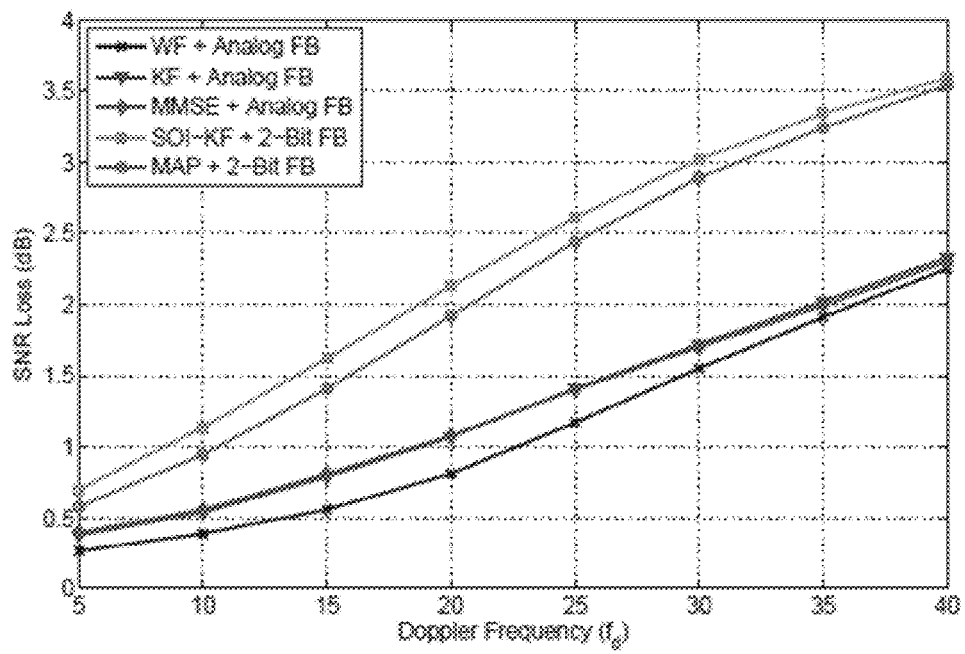

FIG. 9 considers the same setup and network parameters as FIG. 7. The SNR loss that corresponds to the different considered estimation/tracking techniques is plotted versus the Doppler frequency, using the numerically optimized λ and α. The SNR loss is increasing with $f_d$ as expected. FIG. 9 shows that the SNR loss due to the 2-bit quantization (i.e., 2-bit MAP and SOI-KF approaches), as compared to the case with analog-signal feedback (i.e., KF, MMSE, and WF approaches), is small for small $f_d$, and increases as $f_d$ increases. FIG. 9 also shows that the 2-bit MAP approach outperforms the SOI-KF approach for the considered $f_d$ range, and that the MMSE and KF approaches are very close in performance.

Figure 10:
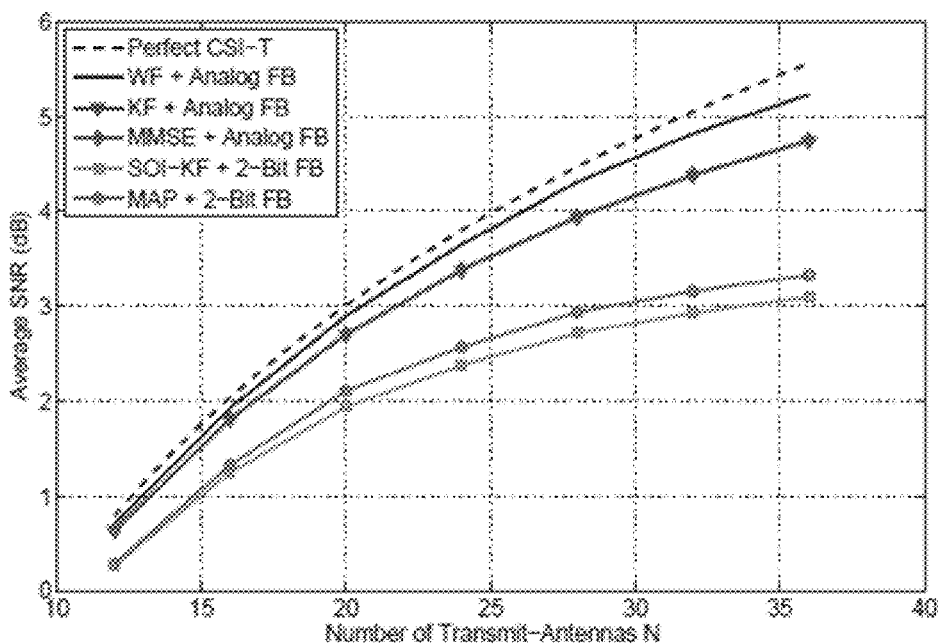

In FIG. 10, the average achieved SNR using the numerically optimized λ and α is plotted as a function of N, considering a setup with $f_d$=10 Hz, $C_h = \sigma_h^2 I$, $\sigma_h^2$=0.1, and $\sigma_v^2$=0.01. FIG. 10 shows that the average SNR is increasing with N as expected, and that the gap between the average SNR achieved with 2-bit quantization (using the 2-bit MAP and SOI-KF approaches) and the average SNR achieved with analog-signal feedback (using the KF, MMSE, and WF approaches), is increasing as N increases. FIG. 10 also shows that the 2-bit MAP approach outperforms the SOI-KF approach for the considered range of N, and that the MMSE and KF approaches are very close in performance. Using the average SNR expression of equation (32) achieved using GLA for the codebook-based beamforming framework (assuming perfect CSI at the receiver), it can be shown that at least B=40 bits are required to achieve the same performance as the 2-bit MAP approach when N=16 (1.33 dB), and at least B=45 bits are required when N=36 (3.33 dB). Computing the transition probabilities for the finite-state Markov chain model may be prohibitive in these cases.

Figure 11:
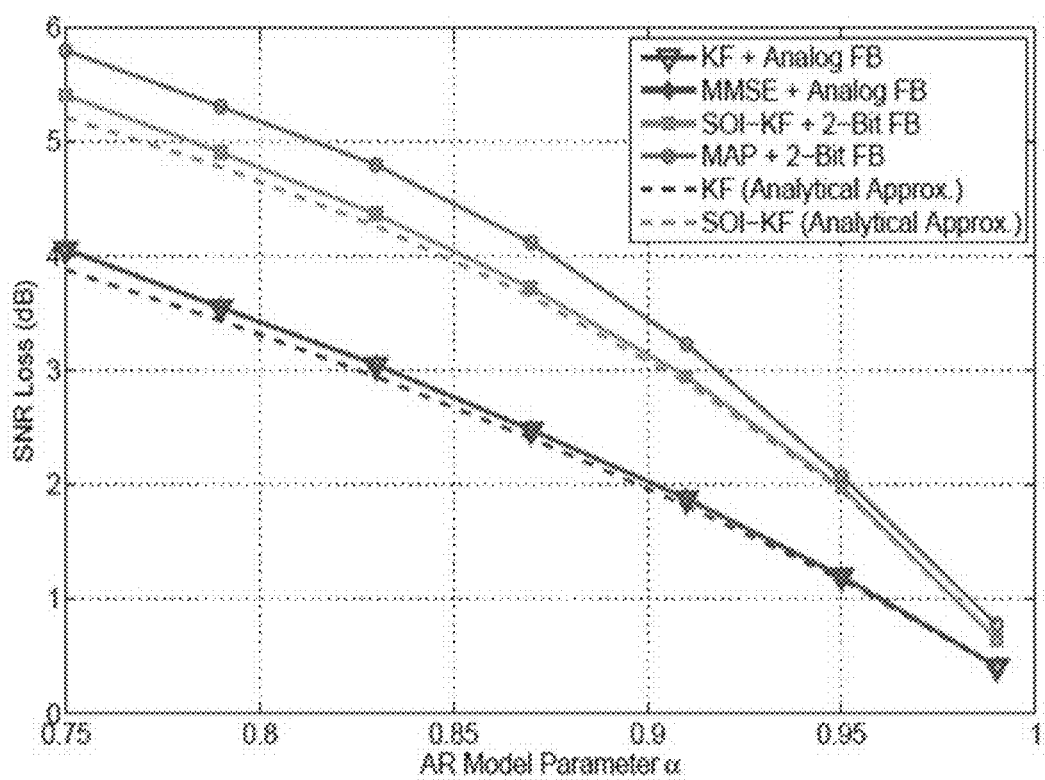

FIG. 11 considers the AR channel model (1), with N=10, $C_{\bar{h}} = \sigma_h^2 I$, $\sigma_h^2 = 0.1$, and $\sigma_v^2 = 0.01$. The SNR loss for the considered techniques is plotted versus α, where the numerically optimized λ is used for the MMSE and 2-bit MAP approaches. FIG. 11 also plots the analytical approximations for the KF and SOI-KF approaches using equations (29) and (31), respectively. For the AR model of equation (1), the performance of the KF (5) and the WF (9) are identical for large n. FIG. 11 shows the decrease of the SNR loss as α increases as expected. FIG. 11 also shows that the SOI-KF approach outperforms the 2-bit MAP approach for the considered AR channel model, and that the performances of the MMSE and KF approaches are very close. Moreover, FIG. 11 shows that the approximations derived in equations (29) and (31) are tight, particularly for large α values. Considering the average SNR achieved using GLA for the codebook-based beamforming, it can be shown using equation (32) that at least B=12 bits and B=25 bits are required to achieve the same performance of the SOI-KF approach when α=0.95 and α=0.99, respectively.

Discussed above are various new approaches for channel tracking and transmit beamforming with frugal feedback, e.g., very limited and judiciously designed feedback. Instead of putting the burden of channel estimation and codebook search on the receiver, the discussed techniques shift the bulk of the work (e.g., processing and other resource-consuming tasks) to the transmitter. Using separate beamforming weight vectors for pilot and payload transmission, the transmitter sends a single pilot symbol per channel dwell time block, while the receiver simply sends back a coarsely quantized 2-bit version of the received pilot signal (or the corresponding innovation, in the case of AR modeling). For channel tracking, the discussed techniques include a novel 2-bit MAP algorithm, as a 'universal' complement to an extended version of the SOI-KF framework, which may be advocated when the channel can be modeled as an AR process. In the AR case, the techniques derive closed-form expressions for the resulting channel MSE, and tight approximations for the corresponding SNR, assuming circular single-antenna beamforming for the pilots. Simulations confirmed that by exploiting the spatio-temporal correlation of the channel, the performance achieved using the described frugal feedback approaches is close to that attainable with perfect CSI at the transmitter. Simulations also showed that very large-size codebooks are required for codebook-based beamforming to achieve the same performance as the described approaches. The obtained results help pave the way for using transmit beamforming for massive MIMO in FDD instead of TDD mode.

An example system model for a system in which the receiver has multiple receive antennas is described below. Consider a time-varying MIMO channel with $N_t$ transmit antennas and $N_r$ receive antennas denoted by $H(n) \in \mathbb{C}^{N_r \times N_t}$, where n is the time index. Let $$\bar{h}(n) = [\text{Re}\{\text{vec } H(n)\}^T, \text{Im}\{\text{vec } H(n)\}^T]^T \quad (1.1)$$

It is assuming that $E[\bar{h}(n)\bar{h}(n)^T] = R_{\bar{h}}$ and $\bar{h}(n)$ evolves according to the first-order AR model given below.

$$\bar{h}(n) = \alpha \bar{h}(n-1) + u(n) \quad (1.2)$$

where u(n) is the driving input for the AR state-model and is a zero-mean white Gaussian process with autocorrelation $E[u(i)u(j)^T] = [(1-\alpha^2)R_{\bar{h}}] \delta(i-j)$.

At every time-index n, the transmitter (Tx) sends a known scalar pilot symbol x(n) multiplied by a beamforming vector $w_n$. The received signal at the receiver (Rx) is given by $$y(n) = W_n^H[\text{vec } H(n)] + v(n) \quad (1.3)$$

where v(n) is the measurement noise vector such that $v(n) \sim CN(0, \sigma_v^2 I)$, $W_n \in \mathbb{C}^{N_r \times N_t N_r}$ and $W_n(k, :)$ is the $k^{th}$ row of $W_n$ which has $w_n$ embedded in it from the indices $(k-1)N_t+1:kN_t$. For example, when $N_r=2$, $$w_n = \begin{bmatrix} w_n & 0 \\ 0 & w_n \end{bmatrix} \quad (1.4)$$

Denote the predicted estimates of the state vector as $\hat{\bar{h}}(n|n-1)$ (i.e., estimate of $\bar{h}(n)$ based on the observations till time index n-1.

$$\hat{\bar{h}}(n|n-1) = \alpha \hat{\bar{h}}(n-1|n-1) \quad (1.5)$$

The SOI-KF for time index n as described below.
Step 1.

$$\hat{\bar{h}}(n|n-1, 0) = \hat{\bar{h}}(n|n-1) = \alpha \hat{\bar{h}}(n-1|n-1) \quad (1.6)$$

$$M(n|n-1, 0) = M(n-n-1) = \alpha^2 M(n-1|n-1) + (1-\alpha^2)R_{\bar{h}} \quad (1.7)$$

where $M(n|n-1) = E\left[\left(\bar{h}(n) - \hat{\bar{h}}(n|n-1)\right)\left(\bar{h}(n) - \hat{\bar{h}}(n|n-1)\right)^T\right]$ Step 2. For m=1:Nr $$w_r(n,m) = [\text{Re}\{W_n(m,:)\} \text{Im}\{W_n(m,:)\}]^T \quad (1.8)$$

$$w_i(n,m) = [-\text{Im}\{W_n(m,:)\} \text{Re}\{W_n(m,:)\}]^T \quad (1.9)$$

Compute $$b_r(n,m) = \text{sign}[\text{Re}\{y(n,m)\} - w_r(n,m)^T \hat{\bar{h}}(n|n-1,m-1)] \quad (1.10)$$

$$b_i(n,m) = \text{sign}[\text{Im}\{y(n,m)\} - w_i(n,m)^T \hat{\bar{h}}(n|n-1,m-1)] \quad (1.11)$$

Compute $$k_r(n, m) = \frac{\sqrt{\frac{2}{\pi}} M(n|n-1|m-1)w_r(n, m)b_r(n, m)}{\sqrt{\sigma_v^2/2 + w_r(n, m)^T M(n|n-1|m-1)w_r(n, m)}} \quad (1.12)$$

$$\tilde{M}(n|n-1|m-1) = M(n|n-1|m-1) - k_r(n, m)k_r(n, m)^T \quad (1.13)$$

$$k_i(n, m) = \frac{\sqrt{\frac{2}{\pi}} \tilde{M}(n|n-1|m-1)w_i(n, m)b_i(n, m)}{\sqrt{\sigma_v^2/2 + w_i(n, m)^T \tilde{M}(n|n-1|m-1)w_i(n, m)}} \quad (1.14)$$

$$M(n|n-1|m) = \tilde{M}(n|n-1|m-1) - k_i(n, m)k_i(n, m)^T \quad (1.15)$$

$$\hat{\bar{h}}(n|n-1, m) = \quad (1.16)$$
$$\hat{\bar{h}}(n|n-1, m-1) + k_r(n, m)b_r(n, m) + k_i(n, m)b_i(n, m)$$

end of loop $\hat{\bar{h}}(n|n) = \hat{\bar{h}}(n|n-1, N_r)$ and $M(n|n) =$
$$E\left[\left(\bar{h}(n) - \hat{\bar{h}}(n|n)\right)\left(\bar{h}(n) - \hat{\bar{h}}(n|n)\right)^T\right] = M(n|n-1|N_R)$$

The vectors $b_r(n) = [b_r(n, 1), \ldots, b_r(n, N_r)]$ and $b_i(n) = [b_i(n, 1), \ldots, b_i(n, N_r)]$ are computed at the Rx and fed back to the Tx during every time index n.

The present section of the disclosure discusses a comparison between the quality of the estimate of the individual channel vectors obtained using the vector-state vector-observation model described above (which also utilizes the correlation information available from $R_{\tilde{h}}$ between the channel vectors from the Tx to individual Rx antennas and perform joint estimation based on the vector measurement y) and the vector-state scalar observation model (where the individual channels are estimated based only on the scalar observation obtained at the corresponding Rx antenna, i.e., the channel vector h1 from Tx to Rx antenna 1 is estimated based on y(1) using the algorithm discussed in Mehanna, et al, "Channel tracking and transmit beamforming with frugal feedback," Signal Processing, IEEE Transactions on 62, no. 24 (2014): 6402-6413, which is incorporated herein by reference in its entirety). The channel correlation matrix $R_{\tilde{h}}$ was generated as follows. First a correlation vector $r_{\tilde{h}} \in \mathbb{R}^{2N_tN_r \times 1}$ was generated such that $r_{\tilde{h}}(i) = \rho^{i-1}$, where $\rho$ is a real scalar $\in (0, 1]$. Subsequently this column vector is used to generate a Toeplitz matrix $R_{\tilde{h}} \in \mathbb{R}^{2N_tN_r \times 2N_tN_r}$ such that the $i^{th}$ sub-diagonal and $i^{th}$ super-diagonal is populated using $r_{\tilde{h}}(i)$. For this simulation $\rho = 0.99$ so that the channel vectors from Tx to each Rx antenna is highly correlated. Alternately, the simulations were repeated using a different generation method of $R_{\tilde{h}}$. In this case the channel vectors from Tx to each individual antenna were assumed to be coming from a Rician channel with a strong line-of-sight component. i.e., $\tilde{h}_i = \beta_i \tilde{h}_1 + \sigma_1 z_i$, where $\sigma_1 << 1$, $0 < \beta_i \le 1$, $z_i \sim N(0, I_{2N_t \times 2N_t})$ and $\tilde{h}_1 \sim N(0, R_{\tilde{h}_1})$. Here $\tilde{h}_1 = [\text{Re}\{h_1\}^T, \text{Im}\{h_1\}^T]^T$. Using the Rician model, $R_{\tilde{h}_1}$, $\beta_i$ and $\sigma_1$, the matrix $R_{\tilde{h}}$ can be generated. The simulations were run for $\beta_i = 0.95$ and $\sigma_1 = 0.01$. The results were similar to the ones obtained from the previous method. Therefore, the latter results are included.

FIGS. 12-21 are graphs that plot channel estimation error (in decibels, or dB) against a time index, with respect to various techniques of this disclosure. In each of FIGS. 12-21, curve 900 is associated with a "joint estimation" for a vector state vector observation mode, and curve 902 is associated with an "individual estimation" for a vector state scalar observation mode. Each of FIGS. 12-17 is associated with scenarios in which $R_{\tilde{h}}$ is generated from known values.

Figure 12:
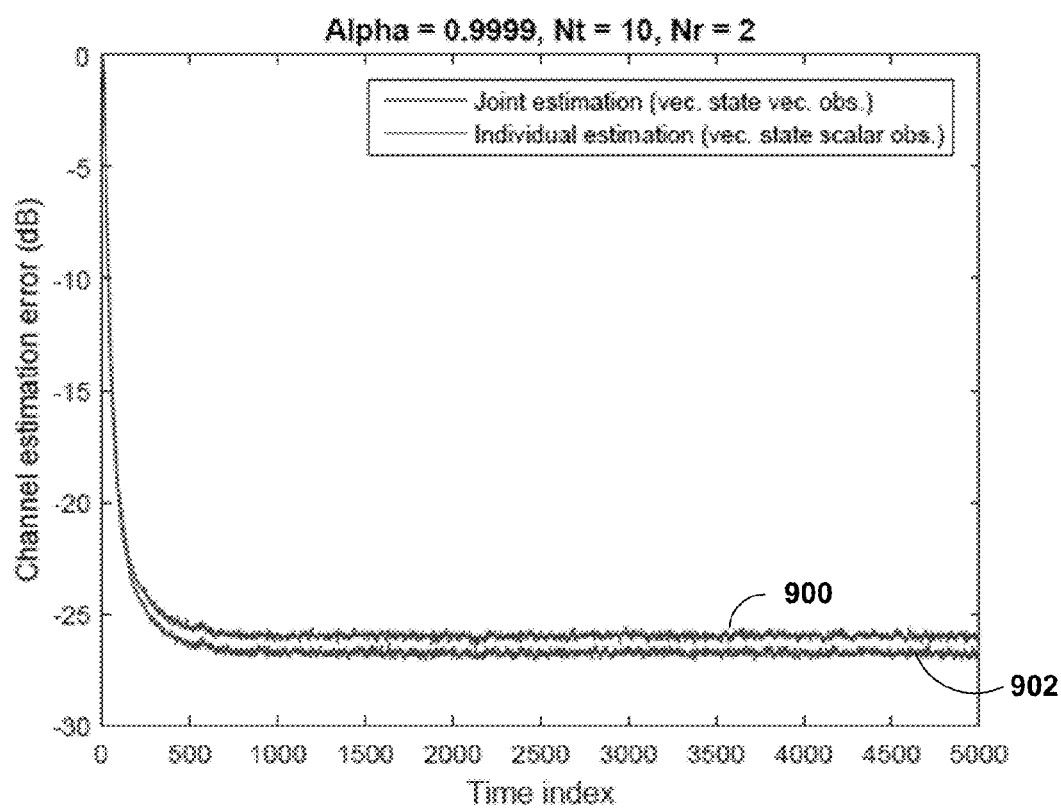
FIGS. 12-21 are graphs that plot channel estimation error (in decibels, or dB) against a time index, with respect to various techniques of this disclosure.

FIG. 12 illustrates a comparison of channel estimation error for $\alpha = 0.9999$, $N_t = 10$, and $N_r = 2$.

Figure 13:
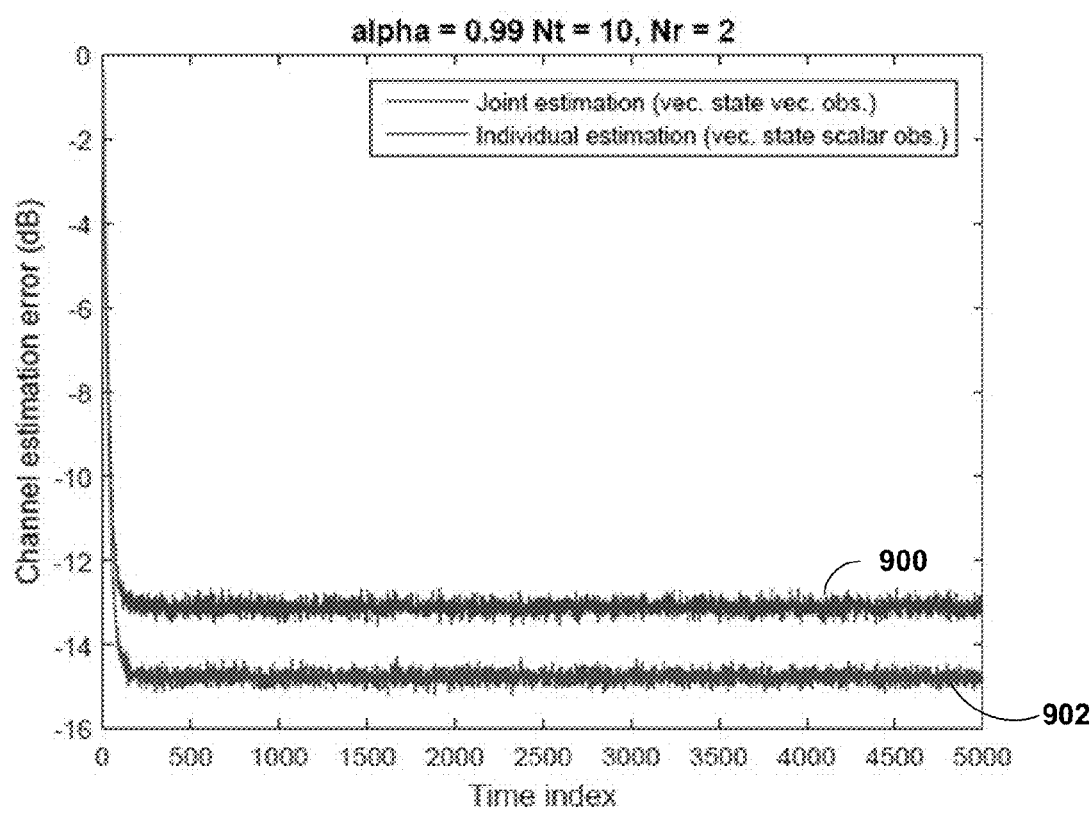

FIG. 13 illustrates a comparison of channel estimation error for $\alpha = 0.99$, $N_t = 10$, and $N_r = 2$.

Figure 14:
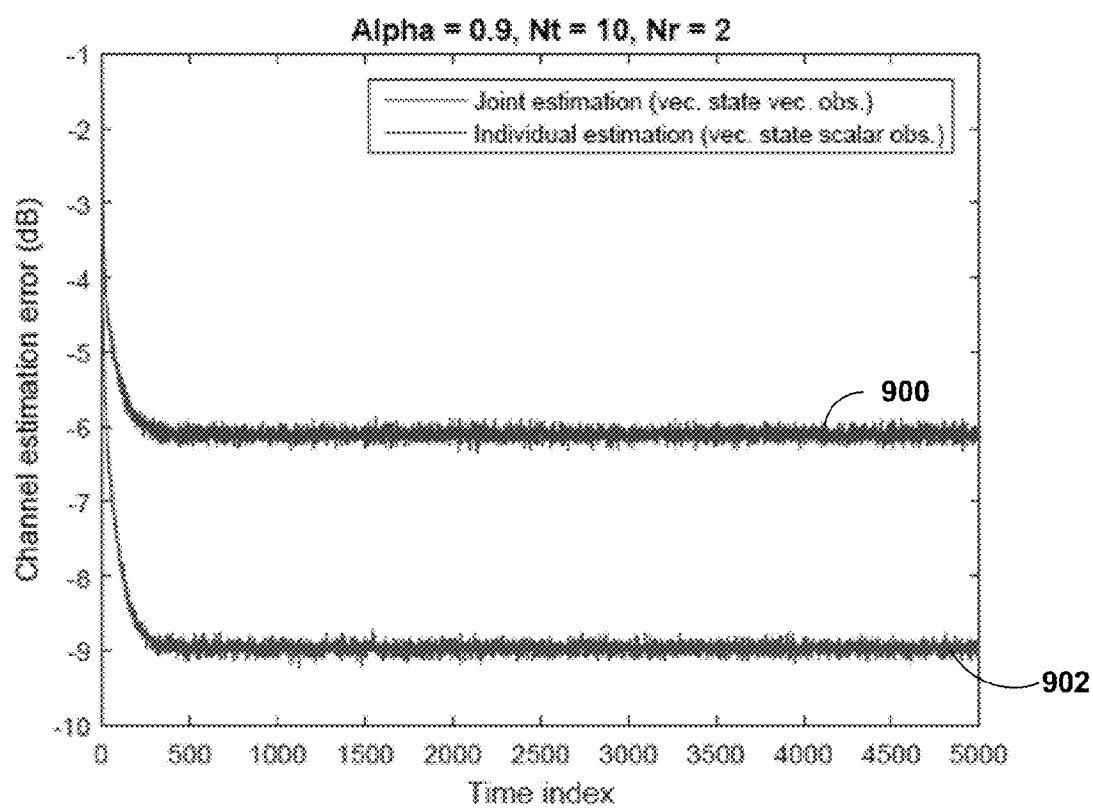

FIG. 14 illustrates a comparison of channel estimation error for $\alpha = 0.9$, $N_t = 10$, and $N_r = 2$.

Figure 15:
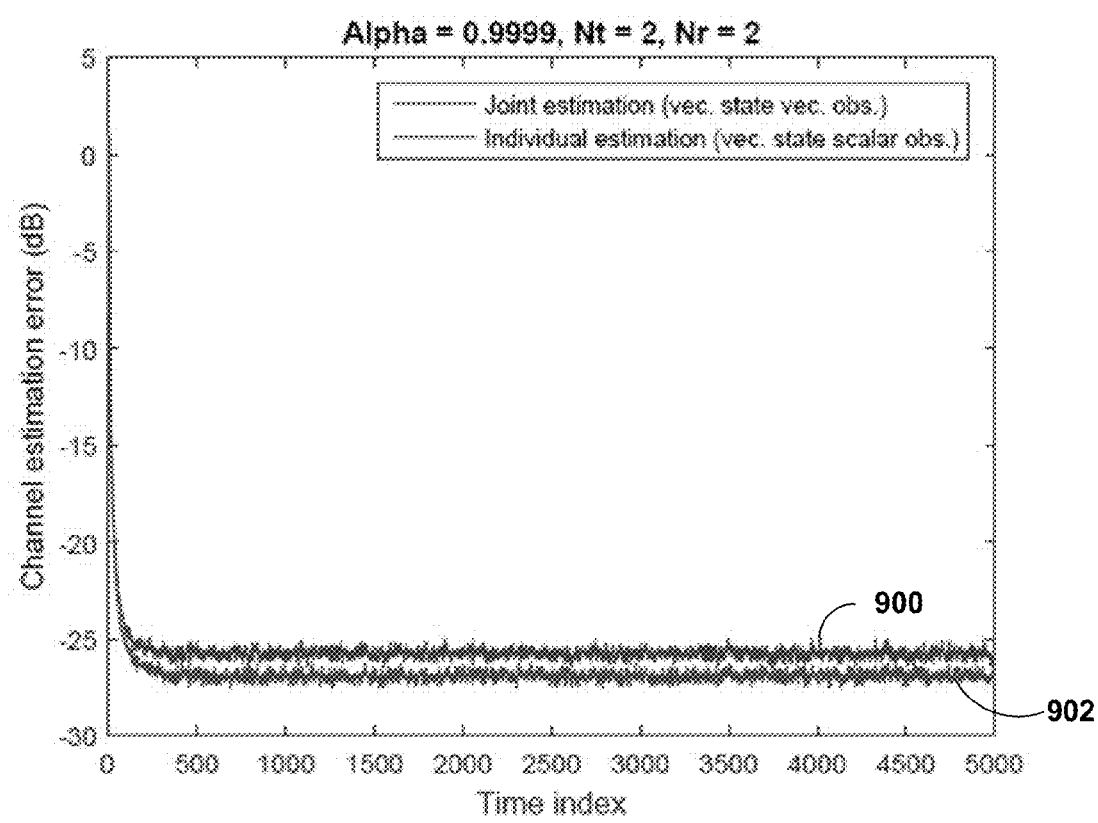

FIG. 15 illustrates a comparison of channel estimation error for $\alpha = 0.9999$, $N_t = 2$, and $N_r = 2$.

Figure 16:
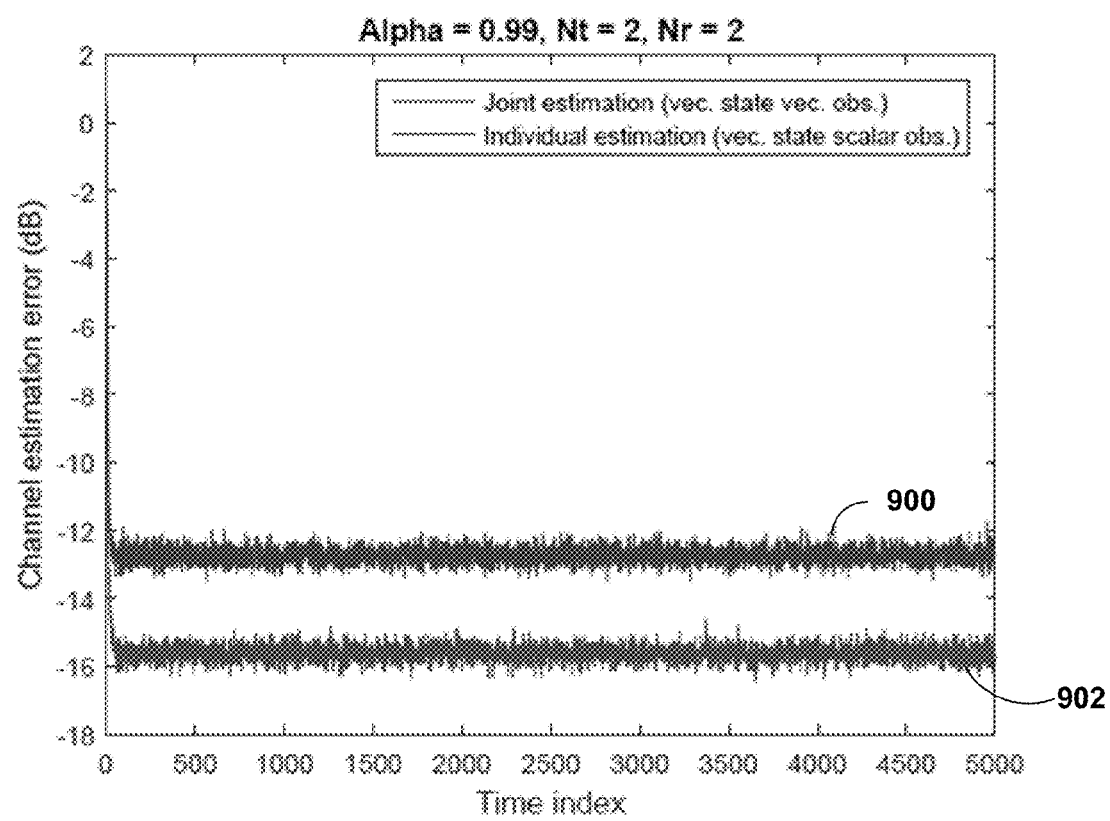

FIG. 16 illustrates a comparison of channel estimation error for $\alpha = 0.99$, $N_t = 2$, and $N_r = 2$.

Figure 17:
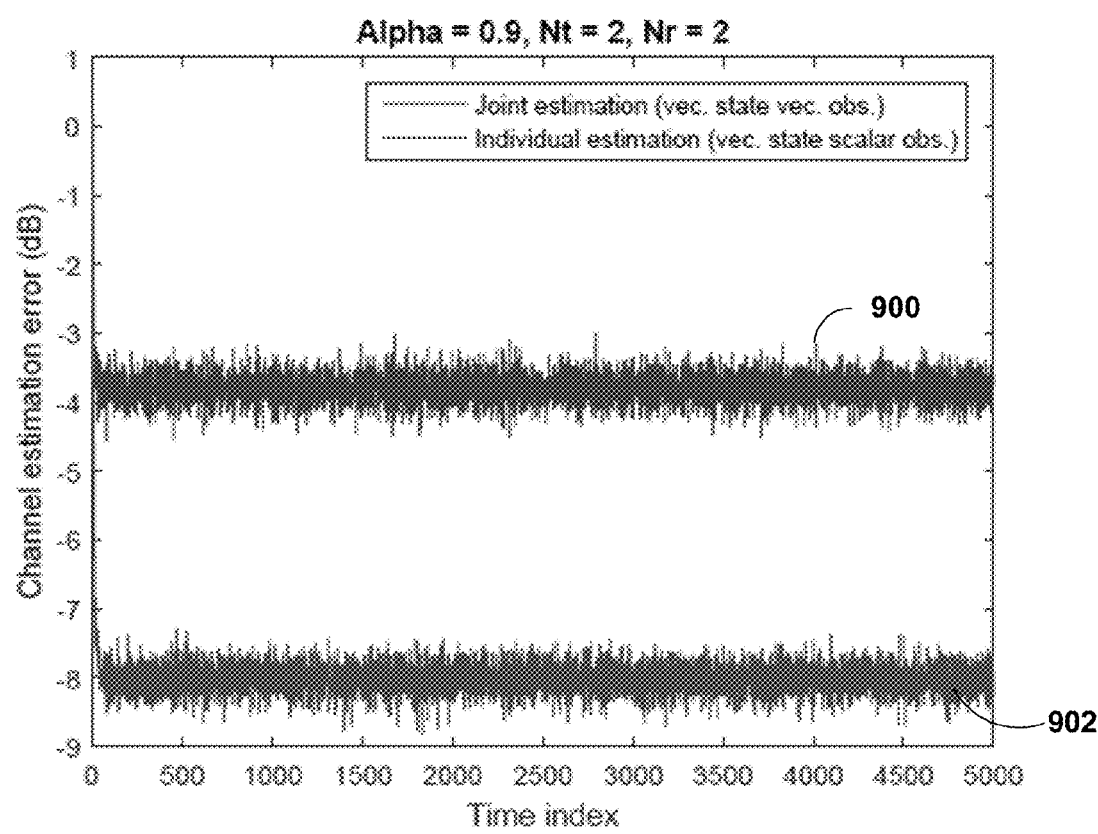

FIG. 17 illustrates a comparison of channel estimation error for $\alpha = 0.9$, $N_t = 2$, and $N_r = 2$.

Each of FIGS. 18-21 is associated with scenarios in which $R_{\tilde{h}}$ is generated using one or more randomly-generated values. More specifically, FIGS. 18-21 illustrate scenarios in which the $R_{\tilde{h}}$ channel correlation matrix has been generated according to the formula $R_{\tilde{h}} = MM^T$ where 'M' is randomly generated.

Figure 18:
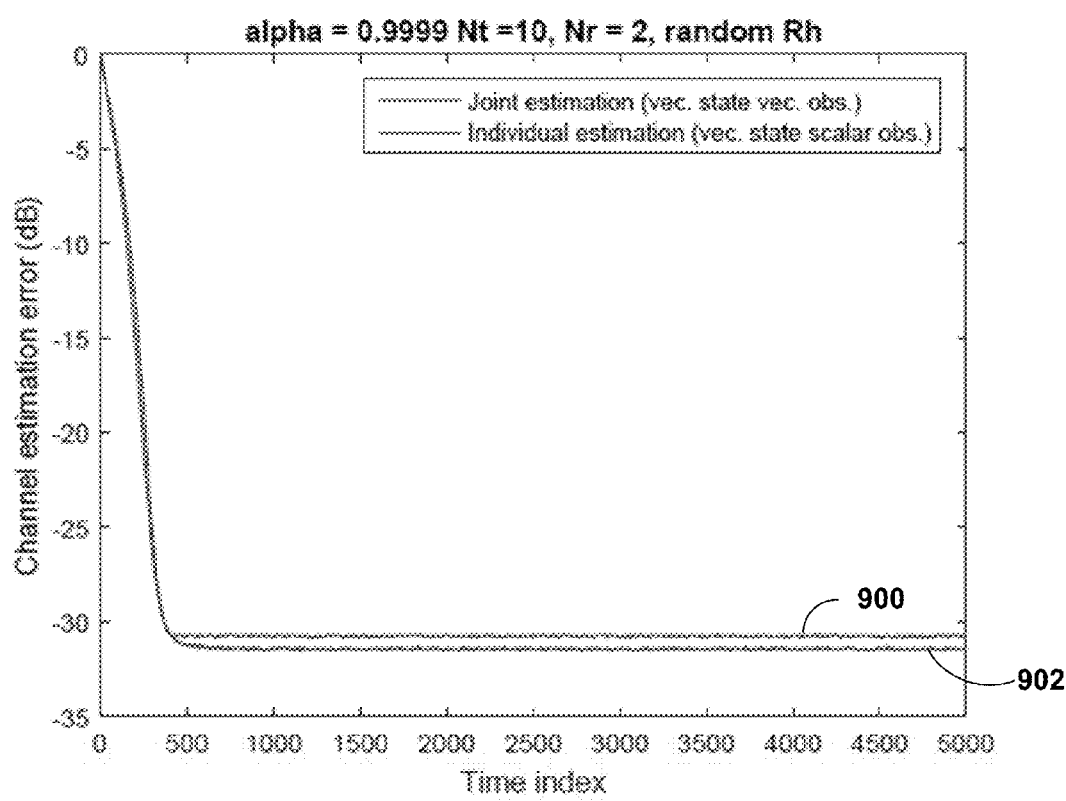

FIG. 18 illustrates a comparison of channel estimation error for $\alpha = 0.9999$, $N_t = 10$, and $N_r = 2$ with randomly-generated $R_{\tilde{h}}$.

Figure 19:
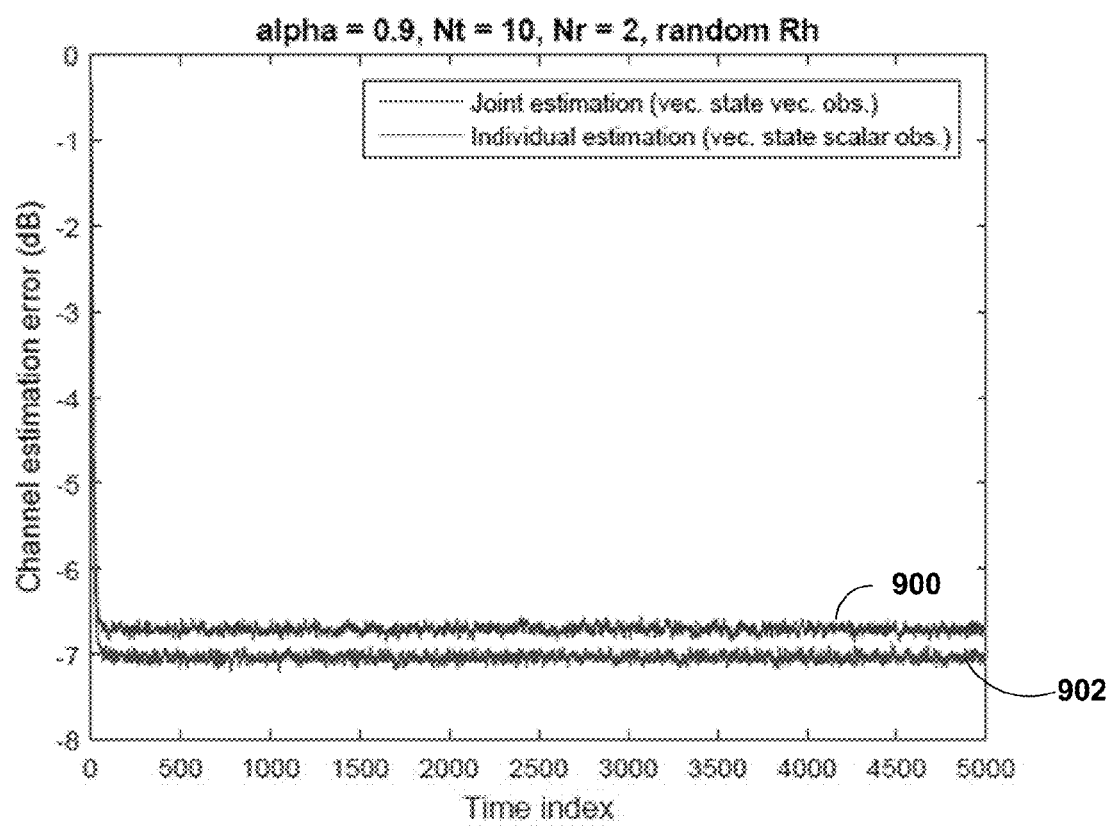

FIG. 19 illustrates a comparison of channel estimation error for $\alpha = 0.9$, $N_t = 10$, and $N_r = 2$ with randomly-generated $R_{\tilde{h}}$.

Figure 20:
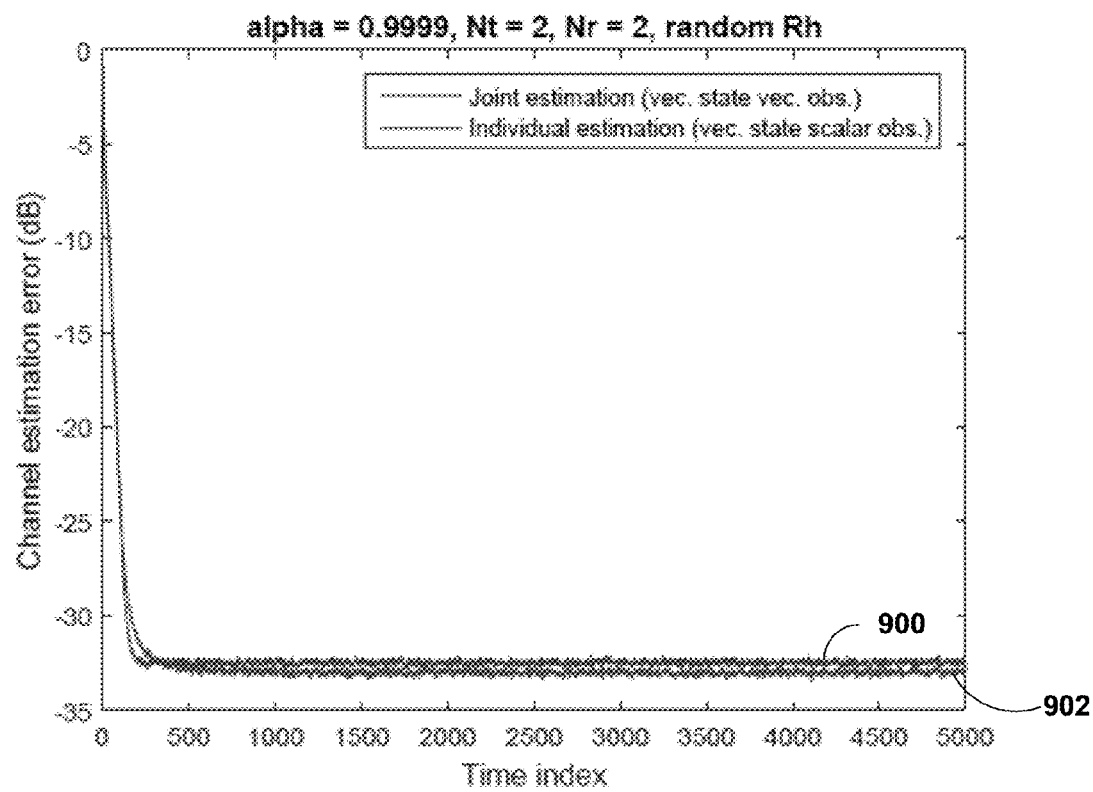

FIG. 20 illustrates a comparison of channel estimation error for $\alpha = 0.9999$, $N_t = 2$, and $N_r = 2$ with randomly-generated $R_{\tilde{h}}$.

Figure 21:
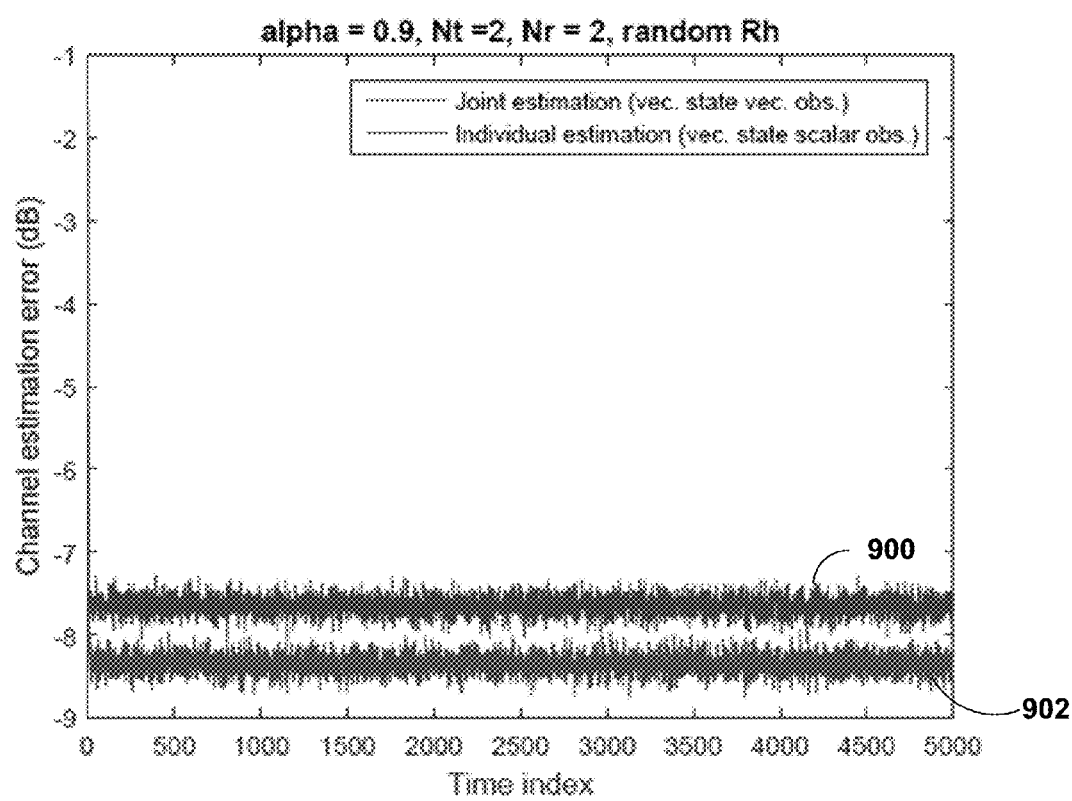

FIG. 21 illustrates a comparison of channel estimation error for $\alpha = 0.9$, $N_t = 2$, and $N_r = 2$ with randomly-generated $R_{\tilde{h}}$.

Various examples have been described. These and other examples are within the scope of the following claims. Further details are described in the Appendix attached hereto, the entire content of which is incorporated herein by reference.

What is claimed is:

1. A method comprising:
sending, through a wireless communication channel by a transmitting device having multiple antennas, a pilot signal in accordance with a first set of transmission parameters, wherein the first set of transmission parameters is determined based on a first estimated state of the wireless communication channel;
receiving, by the transmitting device, channel state feedback from a receiving device, wherein the channel state feedback comprises a quantized representation of a difference between (i) the pilot signal received by the receiving device and (ii) a pilot signal predicted by the receiving device to be received based on a current estimate of the wireless communication channel determined by the receiving device, wherein the quantized representation comprises only a single binary digit representing the real part of the difference, and wherein the single binary digit indicates only a sign of the real part of the difference;
determining, by the transmitting device and based on the channel state feedback, an updated estimated state of the wireless communication channel; and
sending, by the transmitting device and via the wireless communication channel, one or more data symbols in accordance with a second set of transmission parameters, wherein the second set of transmission parameters is determined based on the updated estimated state of the wireless communication channel.

2. The method of claim 1, wherein the quantized representation further comprises a second binary digit representing only a sign of an imaginary part of the difference.

3. The method of claim 1, wherein the first binary digit, $b_r(n)$, is determined using the equation $b_r(n) = \text{sign}[\text{Re}\{y(n)\} - d_r(n)]$, where $y(n)$ is the received pilot signal, $d_r(n) := \text{Re}\{w^H(n)\tilde{h}(n)\}$, $w^H(n)$ is a Hermitian transposition of the first set of transmission parameters, and $\tilde{h}(n)$ is a predicted state of the wireless communication channel.

4. The method of claim 2, wherein the second binary digit, $b_i(n)$, is determined using the equation $b_i(n) = \text{sign}[\text{Im}\{y(n)\} - d_i(n)]$, where $y(n)$ is the received pilot signal, $d_i(n) := \text{Im}\{w^H(n)\tilde{h}(n)\}$, $w^H(n)$ is a Hermitian transposition of the first set of transmission parameters, and $\tilde{h}(n)$ is a predicted state of the wireless communication channel.

5. The method of claim 2, wherein the quantized representation of the difference between (i) the pilot signal received by the receiving device and (ii) the pilot signal predicted by the receiving device to be received based on the current estimate of the wireless communication channel determined by the receiving device indicates a complex analog-amplitude of the pilot signal received at the receiving device.

6. The method of claim 1, wherein determining the updated estimated state of the wireless communication channel comprises determining the updated estimated state of the wireless communication channel using sign of innovation (SOI) Kalman filtering (KF).

7. The method of claim 1, wherein determining the updated estimated state of the wireless communication channel comprises determining the updated estimated state of the wireless communication channel using a maximum a posteriori (MAP) formulation.

8. The method of claim 1, wherein the transmitting device comprise any of a laptop computer, a mobile device, or a communications controller of a cellular communications tower.

9. A method comprising:
receiving, by a receiving device and through a wireless communication channel, a pilot signal transmitted by a transmitting device having a plurality of antennas;
determining, by the receiving device, a current estimate for the wireless communication channel;
determining, by the receiving device, a predicted pilot signal based on the current estimate for the wireless communication channel;
determining, by the receiving device and based on the received pilot signal and the predicted pilot signal, channel state feedback comprising a quantized representation of a difference between (i) the received pilot signal and (ii) the predicted pilot signal, and wherein the quantized representation comprises only a single binary digit representing the real part of the difference, wherein the single binary digit indicates only a sign of the real part of the difference; and
sending, by the receiving device, the channel state feedback to the transmitting device.

10. The method of claim 9, wherein the quantized representation further comprises a second binary digit representing only a sign of an imaginary part of the difference.

11. The method of claim 10,
wherein computing the quantized representation comprises computing the quantized representation to indicate only the sign of the difference, and
wherein the quantized representation of the difference between (i) the received pilot signal and (ii) the predicted pilot signal is indicative of a complex analog-amplitude of the received pilot signal.

12. The method of claim 9,
wherein receiving the pilot signal comprises receiving a plurality of beamformed signals, such that each received beamformed signal is received at a respective receive antenna of a plurality of receive antennas coupled to the receiving device, and
wherein determining the current estimate for the wireless communication channel comprises performing sign of innovation (SOI) Kalman filtering (KF) with respect to each received beamformed signal.

13. The method of claim 12, wherein the current estimate for the wireless communication channel is based at least in part on a spatio-temporal correlation between two or more receive antennas of the plurality of receive antennas coupled to the receiving device.

14. The method of claim 13, wherein performing the SOI KF with respect to each received beamformed signal comprises performing the SOI KF in one of a vector state with a scalar observation mode or a vector state with a vector observation mode.

15. The method of claim 14, further comprising selecting one of the vector state with the scalar observation mode or the vector state with the vector observation mode based on:
a number of receive antennas included in the plurality of receive antennas, and
one or more spatio-temporal correlation characteristics of the wireless communication channel.

16. A transmission device comprising:
multiple antennas for sending and receiving communication information;
a memory for storing the communication information;
one or more processors for processing the communication information, wherein the one or more processors are configured to:
send, through a wireless communication channel and using the multiple antennas, a pilot signal in accordance with a first set of transmission parameters, wherein the first set of transmission parameters is determined based on a first estimated state of the wireless communication channel;
receive, using one or more of the multiple antennas, channel state feedback from a receiving device, wherein the channel state feedback comprises a quantized representation of a difference between (i) the pilot signal received by the receiving device and (ii) a pilot signal predicted by the receiving device to be received based on a current estimate of the wireless communication channel determined by the receiving device, wherein the quantized representation comprises only a single binary digit representing the real part of the difference, and wherein the single binary digit indicates only a sign of the real part of the difference;
determine, based on the channel state feedback, an updated estimated state of the wireless communication channel; and
send, via the wireless communication channel and using the multiple antennas, one or more data symbols in accordance with a second set of transmission parameters, wherein the second set of transmission parameters is determined based on the updated estimated state of the wireless communication channel.

17. The device of claim 16, wherein the quantized representation further comprises a second binary digit representing only a sign of an imaginary part of the difference.

18. A receiving device comprising:
a plurality of receive antennas for receiving communication information;
a memory for storing the communication information; and
one or more processors for processing the communication information, wherein the one or more processors are configured to:
receive, through a wireless communication channel, a pilot signal transmitted by a transmitting device;
determine a current estimate for the wireless communication channel;
determining a predicted pilot signal based on the current estimate of the wireless communication channel;
determine, based on the received pilot signal and the predicted pilot signal, channel state feedback comprising a quantized representation of a difference between (i) the received pilot signal and (ii) the predicted pilot signal, and wherein the quantized representation comprises only a single binary digit representing the real part of the difference, and wherein the single binary digit indicates only a sign of the real part of the difference; and send the channel state feedback to the transmitting device.

19. The device of claim 18, wherein the quantized representation further comprises a second binary digit representing only a sign of an imaginary part of the difference.

20. The device of claim 19,
wherein to compute the quantized representation, the one or more processors are configured to compute the quantized representation to indicate only the sign of the difference, and
wherein the quantized representation of the difference between (i) the received pilot signal and (ii) the predicted pilot signal is indicative of a complex analog-amplitude of the received pilot signal.

* * * * *